US009419761B2

(12) United States Patent
Seo et al.

(10) Patent No.: US 9,419,761 B2
(45) Date of Patent: Aug. 16, 2016

(54) METHOD FOR RECEIVING DOWNLINK DATA, METHOD FOR TRANSMITTING DOWNLINK DATA TO USER EQUIPMENT, AND BASE STATION

(71) Applicant: LG ELECTRONICS INC., Seoul (KR)

(72) Inventors: Hanbyul Seo, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 14/401,404

(22) PCT Filed: May 15, 2013

(86) PCT No.: PCT/KR2013/004308
§ 371 (c)(1),
(2) Date: Nov. 14, 2014

(87) PCT Pub. No.: WO2013/172654
PCT Pub. Date: Nov. 21, 2013

(65) Prior Publication Data
US 2015/0124732 A1 May 7, 2015

Related U.S. Application Data

(60) Provisional application No. 61/647,495, filed on May 15, 2012.

(51) Int. Cl.
*H04L 5/00* (2006.01)
*H04B 7/04* (2006.01)
(52) U.S. Cl.
CPC ............ *H04L 5/0048* (2013.01); *H04B 7/0413* (2013.01)

(58) Field of Classification Search
CPC ...... H04L 45/00; H04L 45/0048; H04B 7/00; H04B 7/0413
See application file for complete search history.

(56) References Cited

U.S. PATENT DOCUMENTS

| 8,995,465 | B2 * | 3/2015 | Bhattad | ................. | H04L 5/0048 370/337 |
| 2011/0199986 | A1 | 8/2011 | Fong et al. | | |
| 2012/0113917 | A1 | 5/2012 | Gaal et al. | | |
| 2013/0039203 | A1 * | 2/2013 | Fong | ...................... | H04B 7/024 370/252 |
| 2013/0301434 | A1 * | 11/2013 | Krishnamurthy | ..... | H04L 1/0026 370/252 |

FOREIGN PATENT DOCUMENTS

KR  10-2012-0015255 A  2/2012

OTHER PUBLICATIONS

Intel Corporation, "Views on CRS/PDSCH RE Collision in Joint Transmission", 3GPP TSG RAN WG1 Meeting #68, R1-120608, Dresden, Germany, Feb. 6-10, 2012, 4 pages.
Texas Instruments, "Rel.11 DL MIMO Enhancements for Single-Cell with RRHs", 3GPP TSG RAN WG1 65, R1-111342, Barcelona, Spain, May 9-13, 2011, pp. 1-4.

* cited by examiner

*Primary Examiner* — Anh Ngoc Nguyen
(74) *Attorney, Agent, or Firm* — Birch, Stewart, Kolasch & Birch, LLP

(57) ABSTRACT

The present invention provides a method and an apparatus for performing an open loop MIMO transmission based on a user equipment-specific reference signal (UE-RS), which is transmitted only for data that is allocated to a specific resource region, and provides a method and an apparatus for receiving the open loop MIMO transmission.

14 Claims, 15 Drawing Sheets

FIG. 9 e.g., RIV=47

| VRB index | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|

| L\S | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 |
| 2 | 15 | 16 | 17 | 18 | 19 | 20 | 21 | 22 | 23 | 24 | 25 | 26 | 27 | 28 | 29 |
| 3 | 30 | 31 | 32 | 33 | 34 | 35 | 36 | 37 | 38 | 39 | 40 | 41 | 42 | 43 | 44 |
| 4 | 45 | 46 | 47 | 48 | 49 | 50 | 51 | 52 | 53 | 54 | 55 | 56 | 57 | 58 | 59 |
| 5 | 60 | 61 | 62 | 63 | 64 | 65 | 66 | 67 | 68 | 69 | 70 | 71 | 72 | 73 | 74 |
| 6 | 75 | 76 | 77 | 78 | 79 | 80 | 81 | 82 | 83 | 84 | 85 | 86 | 87 | 88 | 89 |
| 7 | 90 | 91 | 92 | 93 | 94 | 95 | 96 | 97 | 98 | 99 | 100 | 101 | 102 | 103 | 104 |
| 8 | 105 | 106 | 107 | 108 | 109 | 110 | 111 | 112 | 113 | 114 | 115 | 116 | 117 | 118 | 119 |
| 9 | 119 | 118 | 117 | 116 | 115 | 114 | 113 | 112 | 111 | 110 | 109 | 108 | 107 | 106 | 105 |
| 10 | 104 | 103 | 102 | 101 | 100 | 99 | 98 | 97 | 96 | 95 | 94 | 93 | 92 | 91 | 90 |
| 11 | 89 | 88 | 87 | 86 | 85 | 84 | 83 | 82 | 81 | 80 | 79 | 78 | 77 | 76 | 75 |
| 12 | 74 | 73 | 72 | 71 | 70 | 69 | 68 | 67 | 66 | 65 | 64 | 63 | 62 | 61 | 60 |
| 13 | 59 | 58 | 57 | 56 | 55 | 54 | 53 | 52 | 51 | 50 | 49 | 48 | 47 | 46 | 45 |
| 14 | 44 | 43 | 42 | 41 | 40 | 39 | 38 | 37 | 36 | 35 | 34 | 33 | 32 | 31 | 30 |
| 15 | 29 | 28 | 27 | 26 | 25 | 24 | 23 | 22 | 21 | 20 | 19 | 18 | 17 | 16 | 15 |

METHOD FOR RECEIVING DOWNLINK DATA, METHOD FOR TRANSMITTING DOWNLINK DATA TO USER EQUIPMENT, AND BASE STATION

CROSS REFERENCE TO RELATED APPLICATIONS

This application is the National Phase of PCT/KR2013/004308 filed on May 15, 2013, which claims priority under 35 U.S.C. 119(e) to U.S. Provisional Application No. 61/647,495 filed on May 15, 2012, all of which are hereby expressly incorporated by reference into the present application.

TECHNICAL FIELD

The present invention relates to a wireless communication system and, more particularly, to a method and apparatus for receiving downlink data and a method and apparatus for transmitting downlink data.

BACKGROUND ART

Multiple input multiple output (MIMO) is technology for raising communication capacity or a signal to interference-plus-noise ratio (SINK) in proportion to the number of antennas by using multiple antennas both at a transmitting end and a receiving end. For reference, a scheme of using multiple antennas only at the transmitting end is called multiple input single output (MISO), a scheme of using multiple antennas only at the receiving end is called single input multiple output (SIMO), and a scheme of using a single antenna at both the transmitting end and the receiving end is called single input single output (SISO). MIMO technology, nonetheless, can be used to collectively refer to MIMO, SIMO, MISO, and SISO schemes. The MIMO technology is called multi-antenna technology because multiple transmit antennas and/or multiple receive antennas are used unlike a conventional antenna scheme using a single transmit antenna and a single receive antenna.

According to MIMO technology, the receiving end completes whole data by collecting fragments of data received from some antennas without depending upon a single antenna path in order to receive one whole message. As a result, MIMO technology may raise data transmission rate within a specific range or expand system range at a specific data transmission rate.

In a current radio communication environment, machine-to-machine (M2M) communication, various devices such as smartphones or tablet personal computers (PCs) requiring high data transmission rate, and various techniques have appeared and come into widespread use. This has rapidly increased the quantity of data which needs to be processed in a cellular network. Many communication operators or developers have shown an interest in MIMO technology among a variety of techniques capable of increasing data throughput and have made an effort to optimize MIMO technology because MIMO has the advantage of remarkably increasing transmission/reception performance and communication capacity even without allocating additional frequency or power.

MIMO technology may be used for transmit diversity, beamforming, spatial multiplexing, etc. Transmit diversity is a technique for raising transmission reliability by transmitting the same data through a plurality of transmit antennas. Beamforming is used to increase an SNR of a signal by adding a weight in a plurality of antennas according to a channel state. The weight may be expressed as a weight vector or a weight matrix, which is referred to as a precoding vector or a precoding matrix. Spatial multiplexing is technology capable of transmitting data at high rate without increasing bandwidth of a system by simultaneously transmitting different data through a plurality of transmit antennas. Spatial multiplexing is categorized into spatial multiplexing for a single user and spatial multiplexing for multiple users. Spatial multiplexing for a single user using MIMO is referred to as single user MIMO (SU-MIMO) and spatial multiplexing for multiple users using MIMO is referred to as spatial division multiple access (SDMA) or multiple user MIMO (MU-MIMO).

Meanwhile, the MIMO technology is divided into two transmission schemes: open-loop MIMO and closed-loop MIMO depending upon whether or not channel information about a radio channel formed between transmit antenna(s) and receive antenna(s) is shared between the transmitting end and the receiving end.

DETAILED DESCRIPTION OF THE INVENTION

Technical Problems

The present invention proposes a method for precoding and then transmitting data by a transmitting end and a method for receiving the precoded data by a receiving end in a MIMO system using multiple transmit antennas and/or multiple receive antennas.

The present invention also proposes a method for precoding and then transmitting data by a transmitting end and a method for receiving the precoded data by a receiving end in a MIMO system using multiple transmit antennas and/or multiple receive antennas.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for receiving downlink data by a user equipment, comprising receiving information about one or more channel state information reference signal (CSI-RS) configurations; receiving the downlink data on a physical downlink shared channel (PDSCH); and decoding the downlink data using a user equipment specific reference signal (UE-RS) received on a physical resource block (PRB) to which the PDSCH is mapped, wherein the number of antenna ports for the UE-RS (hereinafter, the number of UE-RS ports) is assumed based on the number of antenna ports of at least one of the one or more CSI-RS configurations (hereinafter, the number of CSI-RS ports).

In another aspect of the present invention, provided herein is a user equipment for receiving downlink data, comprising a radio frequency (RF) unit and a processor configured to control the RF unit, wherein the processor is configured to control the RF unit to receive information about one or more channel state information reference signal (CSI-RS) configurations; is configured to control the RF unit to receive the downlink data on a physical downlink shared channel (PDSCH); and is configured to decode the downlink data using a user equipment specific reference signal (UE-RS) received on a physical resource block (PRB) to which the PDSCH is mapped, and wherein the processor is configured to decode the downlink data by assuming the number of antenna ports for the UE-RS (hereinafter, the number of UE-RS ports) based on the number of antenna ports of at least one of the one or more CSI-RS configurations (hereinafter, the number of CSI-RS ports).

In still another aspect of the present invention, provided herein is a method for transmitting downlink data by a base station, comprising transmitting information about one or more channel state information reference signal (CSI-RS) configurations; transmitting the downlink data on a physical downlink shared channel (PDSCH); and transmitting a user equipment specific reference signal (UE-RS) received on a physical resource block (PRB) to which the PDSCH is mapped, wherein the number of antenna ports for the UE-RS (hereinafter, the number of UE-RS ports) is configured based on the number of antenna ports of at least one of the one or more CSI-RS configurations (hereinafter, the number of CSI-RS ports).

In a further aspect of the present invention, provided herein is a base station for transmitting downlink data, comprising a radio frequency (RF) unit and a processor configured to control the RF unit, wherein the processor controls the RF unit to transmit information about one or more channel state information reference signal (CSI-RS) configurations; controls the RF unit to transmit the downlink data on a physical downlink shared channel (PDSCH); and controls the RF unit to transmit a user equipment specific reference signal (UE-RS) received on a physical resource block (PRB) to which the PDSCH is mapped, and wherein the processor is configured to configure the number of antenna ports for the UE-RS (hereinafter, the number of UE-RS ports) based on the number of antenna ports of at least one of the one or more CSI-RS configurations (hereinafter, the number of CSI-RS ports).

In each aspect of the present invention, the number of UE-RS ports may be configured based on the number of CSI-RS ports of a CSI-RS configuration indicated as a CSI-RS configuration associated with the UE-RS among the one or more CSI-RS configurations, the number of CSI-RS ports of a CSI-RS configuration having a minimum index among the one or more CSI-RS configurations, the number of CSI-RS ports of a CSI-RS configuration having a maximum index among the one or more CSI-RS configurations, a minimum number of CSI-RS ports among the numbers of CSI-RS ports of the one or more CSI-RS configurations, a maximum number of CSI-RS ports among the numbers of CSI-RS ports of the one or more CSI-RS configurations, or a sum of the numbers of CSI-RS ports of the one or more CSI-RS configurations.

In each aspect of the present invention, the number of UE-RS ports may be assumed to be equal to the number of CSI-RS ports.

In each aspect of the present invention, the number of UE-RS ports may be assumed to be equal to the number of CSI-RS ports within a range not exceeding a predetermined number.

In each aspect of the present invention, the UE-RS may be assumed to be precoded by the same precoder in the PRB.

In each aspect of the present invention, the UE-RS may be assumed to be precoded by the same precoder in contiguous PRBs among a plurality of PRBs to which the PDSCH is mapped.

In each aspect of the present invention, the downlink data may be assumed to be precoded by a different precoder according to a resource element to which the downlink data is mapped.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, a downlink data signal can be effectively transmitted or received.

According to the present invention, a downlink data signal can be effectively precoded and transmitted.

According to the present invention, a downlink data signal to which precoding is applied can be effectively decoded.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 9 illustrates a table used for start position and length determination in Type 2 RA.

MODE FOR INVENTION

Figure 1:
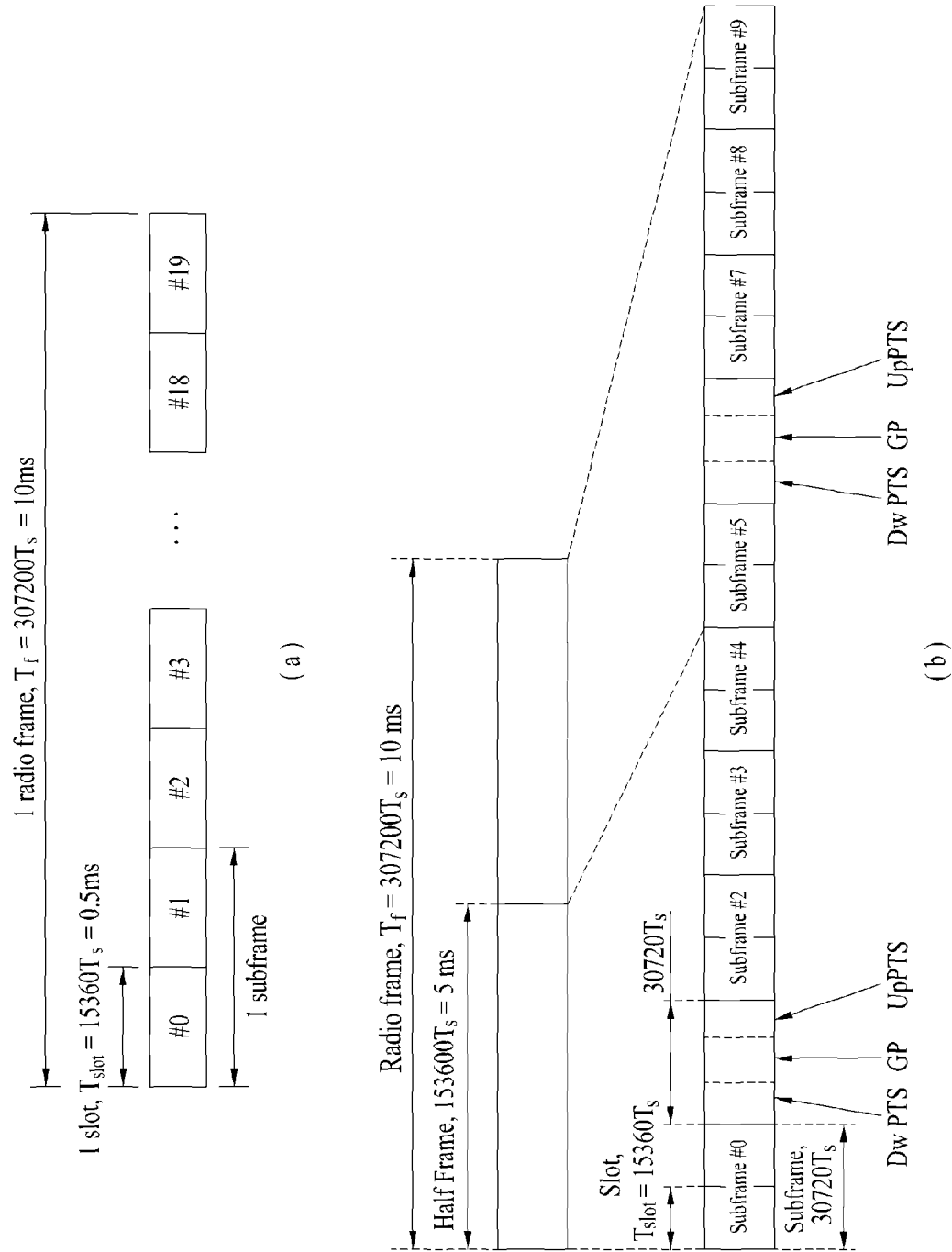
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific det.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, an RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. Unlike a conventional centralized antenna system (CAS) (i.e. a single-node system) including antennas which converge upon an eNB and are controlled by one eNB controller, a multi-node system includes a plurality of nodes separated from one another by a predetermined distance or more. The plural nodes may be managed by one or more eNBs or eNB controllers for controlling operation thereof or scheduling data transmission/reception therethrough. Each node may be connected to an eNB or eNB controller for managing the node through a cable or a dedicated line. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point Tx/Rx (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DSP). When JP is performed, a wider variety of communication environments can be formed, compared to other CoMP schemes. JT refers to a communication scheme by which a plurality of nodes transmit the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted from/to a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink (DL)/uplink (UL) signal of a specific cell refers to a downlink/uplink signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. An interfering cell refers to a cell interfering with a specific cell. Namely, if a signal of a neighboring cell interferes with a signal of a specific cell, the neighboring cell becomes an interfering cell with respect to the specific cell and the specific cell becomes a victim cell with respect to the neighboring cell. If neighboring cells interfere with each other or unilaterally, such interference is referred to as inter-cell interference (ICI). The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A cell for managing radio resources will now be described. A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or bandwidth aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a bandwidth (BW) of 60 MHz. The CCs may be contiguous or non-contiguous in the frequency domain. A BW of UL CC and a BW of DL CC may be the same as each other and are symmetrical, and a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

The eNB may activate all or some of the serving CCs configured in the UE or deactivate some of the serving CCs for communication with the UE. The eNB may change the activated/deactivated CC, and may change the number of CCs which is/are activated or deactivated. If the eNB allocates available CCs to the UE cell-specifically or UE-specifically, at least one of the allocated CCs is not deactivated unless CC allocation to the UE is fully reconfigured or unless the UE performs handover. Such CC which is not deactivated unless CC allocation to the UE is full reconfigured will be referred to as a primary CC (PCC), and CC which may be activated/deactivated freely by the eNB will be referred to as secondary CC (SCC). The PCC and the SCC may be differentiated from each other on the basis of the control information. For example, specific control information may be set to be transmitted and received through a specific CC only. This specific CC may be referred to as the PCC, and the other CC(s) may be referred to as SCC(s).

In the meantime, the 3GPP LTE(-A) system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on downlink will be referred to as a downlink primary CC (DL PCC), and the carrier corresponding to the PCell on uplink will be referred to as an uplink primary CC (UL PCC). A SCell means a cell that may be configured after completion of radio resource control (RRC) connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC). Although the UE is in RRC-CONNECTED state, if it is not configured by carrier aggregation or does not support carrier aggregation, a single serving cell configured by the PCell only exists.

The term "cell" used for carrier aggregation is distinguishable from the term "cell" indicating a certain local area where a communication service is provided by one eNB or one antenna group. In order to differentiate the "cell" indicating a certain local area from the "cell" used for carrier aggregation, in the present invention, the "cell" for carrier aggregation will be referred to as CC, whereas the "cell" for the local area will be simply referred to as cell.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both an eNB and a UE. For example, a cell-specific RS (CRS), a UE-specific RS, a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PDSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In the present invention, a CRS port, a UE-RS port, and a CSI-RS port refer to an antenna port configured to transmit a CRS, an antenna port configured to transmit a UE-RS, and an antenna port configured to transmit a UE-RS, respectively. Antenna ports configured to transmit CRSs may be distinguished from each other by the locations of REs occupied by CRSs according to CRS ports, antenna ports configured to transmit UE-RSs may be distinguished from each other by the locations of REs occupied by UE-RSs according to UE-RS ports, and antenna ports configured to transmit CSI-RSs may be distinguished from each other by the locations of REs occupied by CSI-RSs according to CSI-RS ports. Therefore, the terms CRS/UE-RS/CSI-RS ports may also be used as the terms indicating patterns of REs occupied by CRSs/UE-RSs/CSI-RSs.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
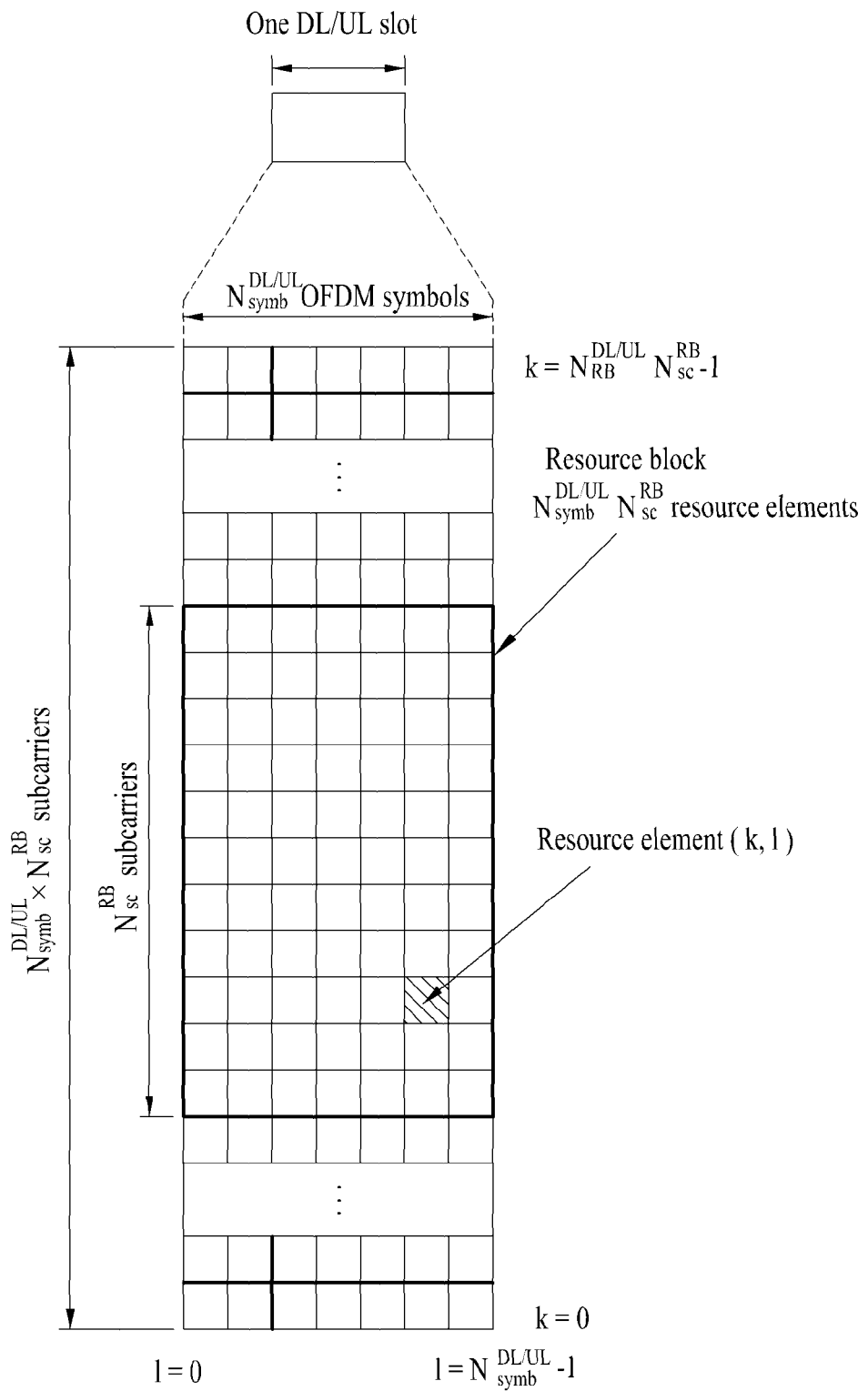
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/DL}_{RB} * N^{RB}_{sc}$ subcarriers and $N^{DL/DL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{DL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} 1 - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). The relation between the PRB number $n_{PRB}$ in the frequency domain and resource elements (k, l) in a slot can be defined as follows.

$$n_{PRB} = \left\lfloor \frac{k}{N^{RB}_{sc}} \right\rfloor \quad \text{[Equation 1]}$$

In Equation 1, k denotes a subcarrier index, and $N^{RB}_{sc}$ denotes the number of subcarriers included in one RB.

A VRB is a type of logical resource allocation unit introduced for resource allocation. The VRB is equal in size to the PRB. The VRB is classified into a localized VRB (LVRB) and a distributed VRB (DVRB) according to a VRB-to-PRB mapping scheme. Regardless of VRB type, a pair of RBs is allocated over two slots of a subframe by a single VRB number $n_{VRB}$. LVRBs are directly mapped to PRBs so that VRB numbers (or VRB indexes) correspond equally to PRB numbers. That is, $n_{PRB} = n_{VRB}$. The LVRBs are numbered from 0 to $N^{DL}_{VRB} - 1$ and $N^{DL}_{VRB} = N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Two PRBs, which are respectively located at two slots of the subframe and have the same VRB number, will be referred to as VRB pair. A PRB pair and a VRB pair may be referred to as a RB pair. The RB for a UE or UE group is allocated on the basis of the VRB. Basically, VRBs having the same VRB number are allocated to the same UE or UE group. Mapping of the localized VRB to the PRB is called localized mapping and mapping of the distributed VRB to the PRB is called distributed mapping. A method of mapping the VRB to the PRB will be described in more detail with reference to FIG. 5.

Figure 3:
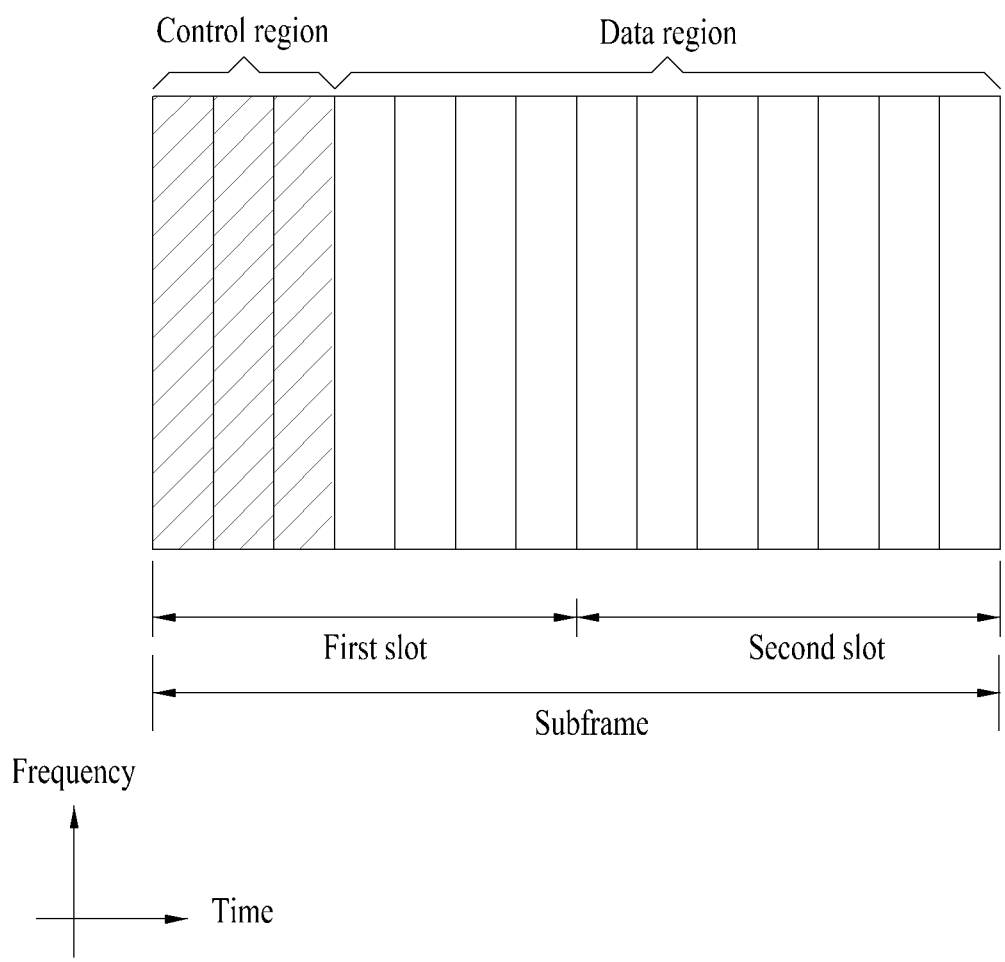
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. A transmit format and resource allocation information of a downlink shared channel (DL-SCH) are called DL scheduling information or DL grant. A transmit format and resource allocation information of an uplink shared channel (UL-SCH) are called UL scheduling information or UL grant. The size and usage of the DCI carried by one PDCCH are varied depending on DCI formats. The size of the DCI may be varied depending on a coding rate.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logical allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PCFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status.

For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs may have different sizes and a dedicated SS and a common SS are defined. The dedicated SS is a UE-specific SS and is configured for each individual UE. The common SS is configured for a plurality of UEs. All UEs receive information about the common SS. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

In the meantime, in order to maintain operation load based on blind decoding at a certain level or less, not all the DCI formats are searched at the same time. For example, the UE is configured semi-statically by upper layer signaling to receive PDSCH data signaled through the PDCCH in accordance with one of transmission modes 1 to 9. Table 3 illustrates a transmission mode for configuring multi-antenna technology and a DCI format where the UE performs blind decoding in accordance with the corresponding transmission mode.

TABLE 3

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
| | DCI format 2C | UE specific by C-RNTI | Up to 8 layer transmission, ports 7-14 |

Transmission modes 1 to 9 are listed in Table 3 but transmission modes other than the transmission modes listed in Table 3 may be defined.

In particular, Table 3 illustrates a relation between PDSCH and PDCCH configured by C-RNTI. The UE configured to decode the PDCCH with CRC scrambled in C-RNTI by an upper layer decodes the PDCCH and also decodes the corresponding PDSCH in accordance with each combination defined in Table 3. For example, if the UE is configured in a transmission mode 1 by upper layer signaling, the UE acquires either DCI of DCI format 1A or DCI of DCI format 1 by respectively decoding the PDCCH through the DCI format 1A and 1.

Figure 4:
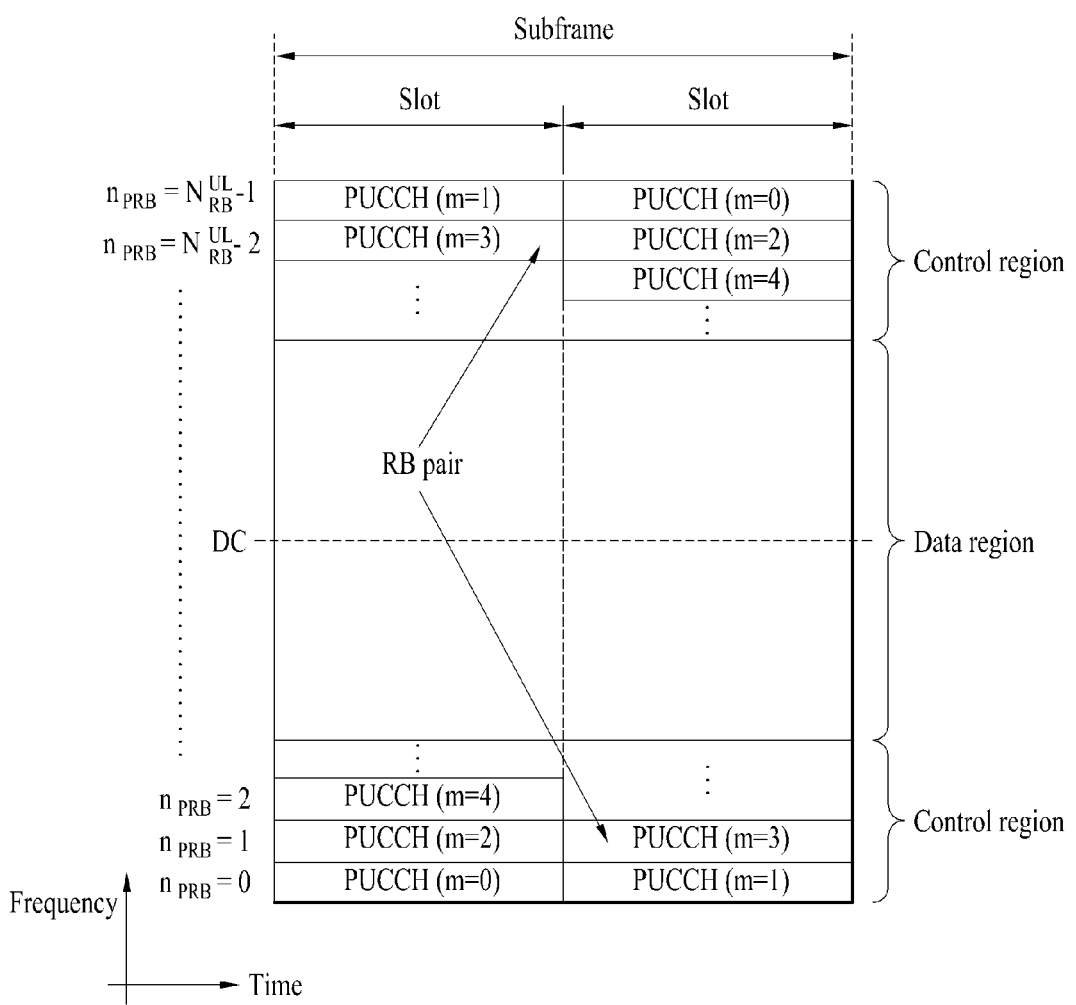
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

Figure 5:
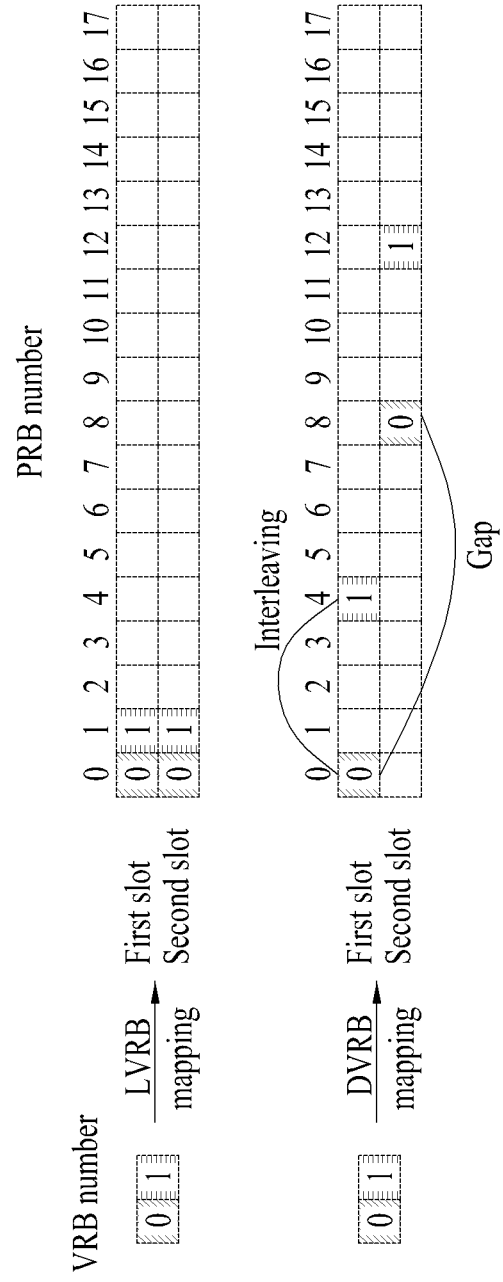
FIG. 5 illustrates a method of mapping a virtual resource block (VRB) to a physical resource block (PRB).

FIG. 5 illustrates a method of mapping a VRB to a PRB.

Referring to FIG. 5, LVRBs are directly mapped to PRBs so that VRB numbers (or VRB indexes) correspond equally to PRB numbers. That is, $n_{PRB}=n_{VRB}$. The LVRBs are numbered from 0 to $N^{DL}_{RB}-1$ and $\tilde{N}^{DL}_{VRB}=N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Specifically, the DVRBs may be mapped to the PRBs as follows. The following table illustrates RB gap values.

TABLE 3

| System BW ($N_{RB}^{DL}$) | Gap ($N_{gap}$) | |
|---|---|---|
| | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g. PRB unit) when VRBs of the same number are mapped to PRBs of the first and second slots. If $6 \leq N^{DL}_{RB} \leq 49$, only one gap is defined ($N_{gap}=N_{gap,1}$). If $50 \leq N^{DL}_{RB} \leq 110$, two gap values $N_{gap,1}$ and $N_{gap,2}$ are defined. $N_{gap}=N_{gap,1}$ or $N_{gap}=N_{gap,2}$ is signaled through DL scheduling. DVRBs are numbered from 0 to $N^{DL}_{VRB}-1$. For $N_{gap}=N_{gap,1}$, $N^{DL}_{VRB}=N^{DL}_{VRB,gap1}=2 \cdot \min(N_{gap}, N^{DL}_{RB}-N_{gap})$. For $N_{gap}=N_{gap,2}$, $N^{DL}_{VRB}=N^{DL}_{VRB,gap2}=\text{floor}(N^{DL}_{RB}/2 \cdot N_{gap}) \cdot 2 \cdot N_{gap}$. Here, min(A, B) indicates the smaller of A and B and floor(x) indicates the largest integer not greater than x.

Consecutive $\tilde{N}^{DL}_{VRB}$ VRB numbers constitute a unit for VRB number interleaving. If $N_{gap}=N_{gap,1}$, then $\tilde{N}^{DL}_{VRB}=N^{DL}_{VRB}$ and if $N_{gap}=N_{gap,2}$, then $\tilde{N}^{DL}_{VRB}=2N_{gap}$. VRB number interleaving of each interleaving unit may be performed using four columns and $N_{row}$ rows. $N_{row}=\{\text{ceil}(\tilde{N}^{DL}_{VRB}/(4P))\} \cdot P$ and P is the size of an RBG. Here, ceil denotes a ceiling function and ceil(x) is a minimum integer not smaller than x. An RBG is defined as P consecutive RBs. VRB numbers are written in a matrix on a row-by-row basis and are read on a column-by-column basis. $N_{null}$ null values are inserted into the last $N_{null}/2$ row of the second and fourth columns and $N_{null}=N_{row}-\tilde{N}^{DL}_{VRB}$. The null values are ignored upon reading.

Meanwhile, in a 3GPP LTE/LTE-A system, various resource allocation (RA) types (e.g. Type 0 RA, Type 1 RA, Type 2 RA, etc.) are defined. For Type 0 RA or Type 1 RA, DCI formats 1, 2, and 2A are used and, for Type 2 RA, DCI formats 1A, 1B, 1C, and 1D are used. In Type 0 RA, RB allocation information includes a bitmap indicating a resource block group (RBG) allocated to a UE. The RBG is a set of one or more continuous PRBs. The size of the RBG depends upon system bandwidth. In Type 1 RA, RB allocation information indicates resources in an RBG subset allocated to a scheduled UE in units of PRBs. In Type 2 RA, RB allocation information indicates a set of VRBs continuously allocated to the scheduled UE.

Figure 6:
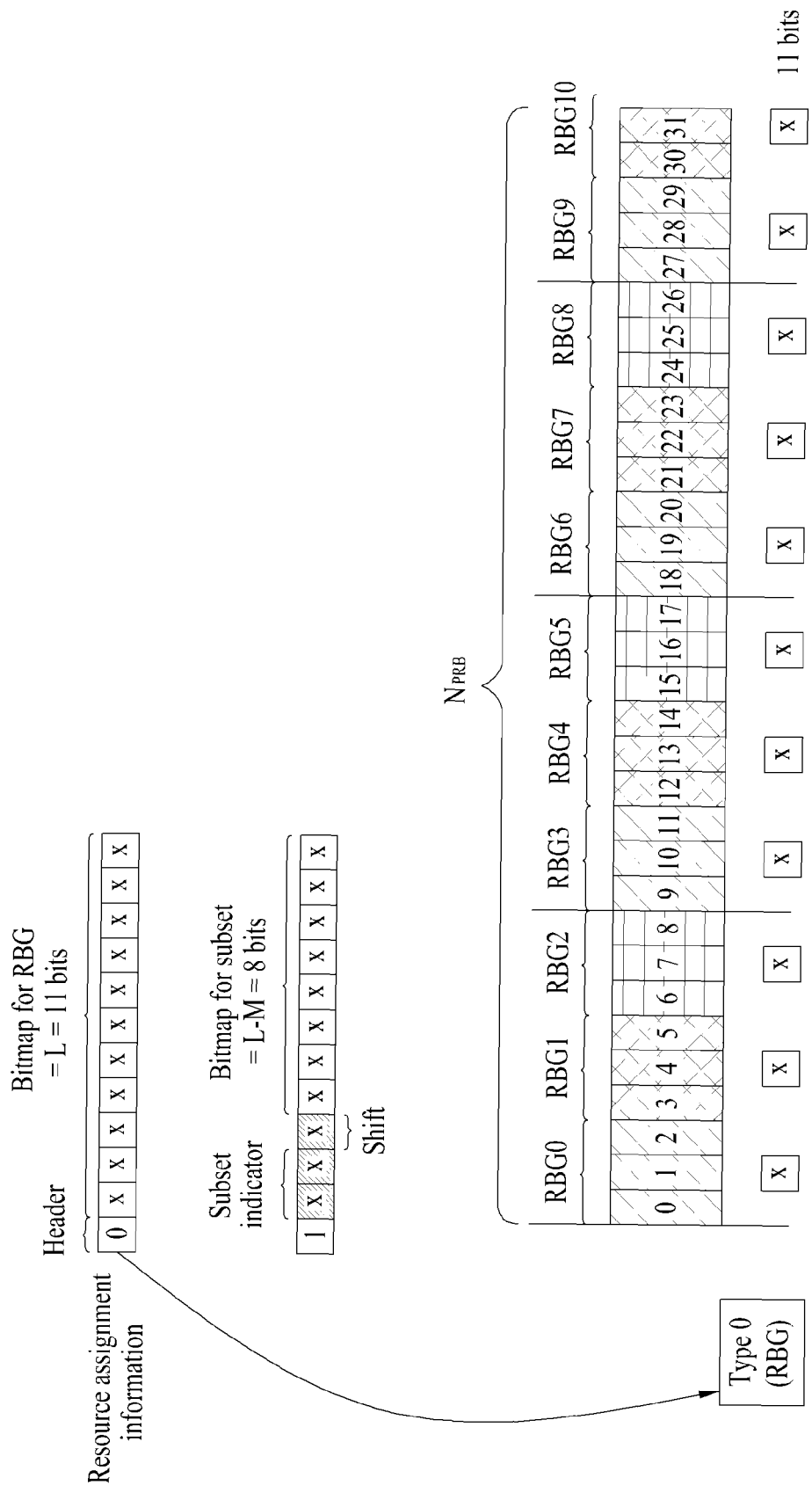
FIG. 6 illustrates control information formats for Type 0 resource allocation (RA) and an example of resource allocation thereof.
Figure 7:
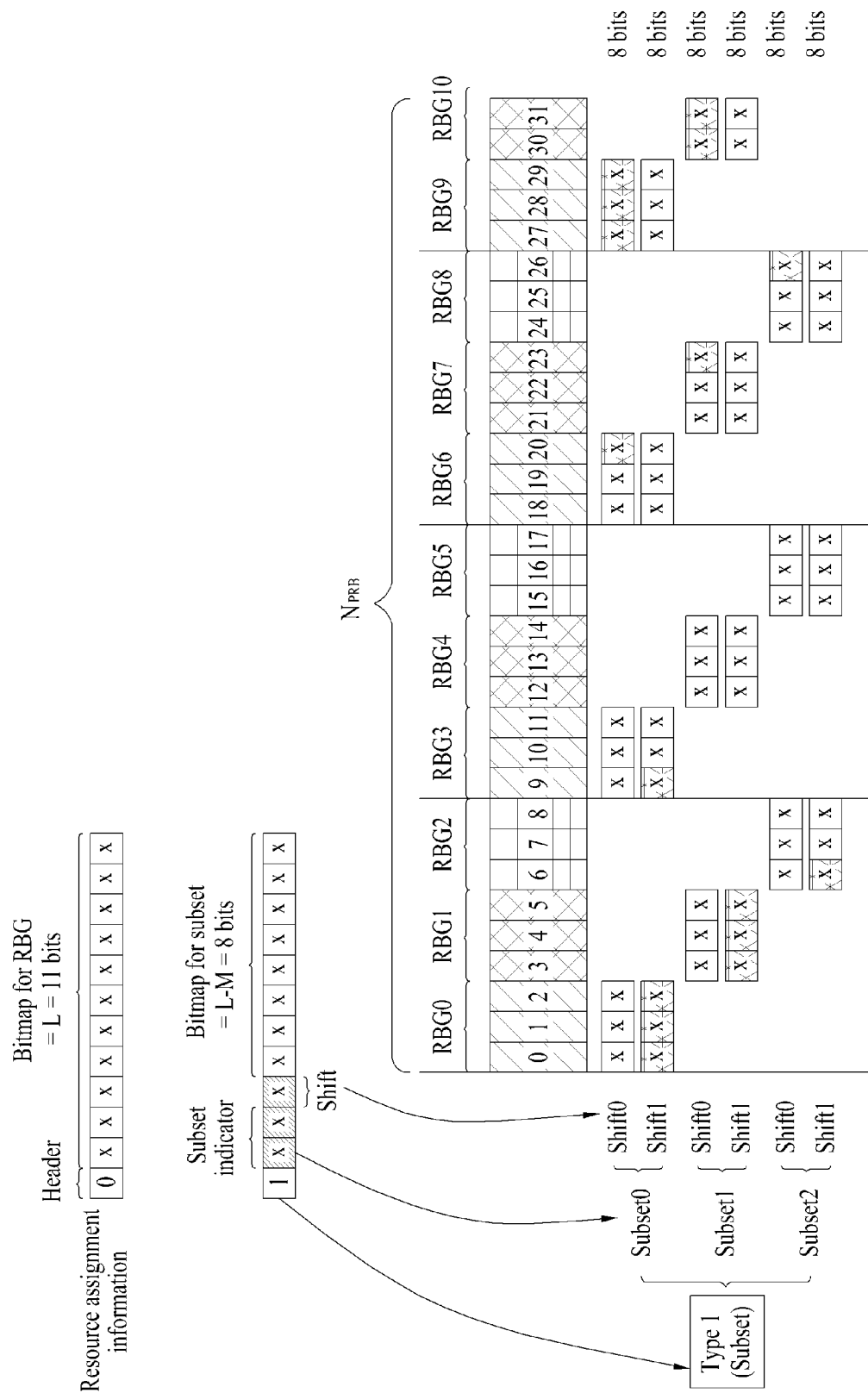
FIG. 7 illustrates control information formats for Type 1 RA and an example of resource allocation thereof.
Figure 8:
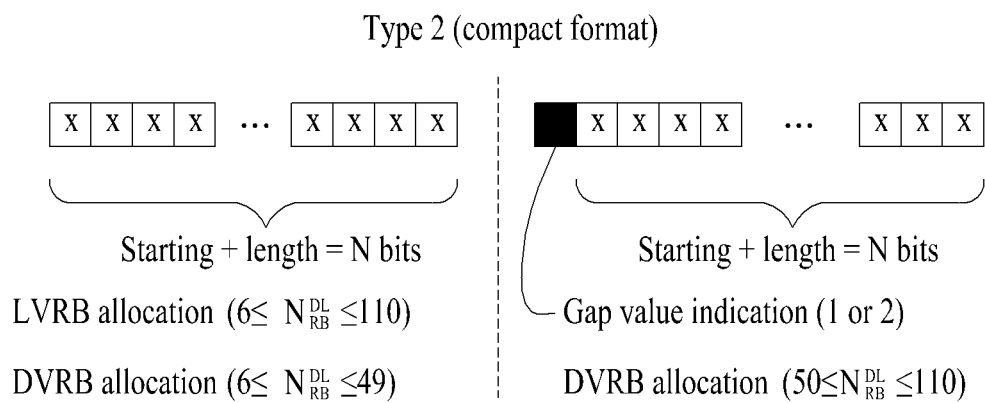
FIG. 8 illustrates control information formats for Type 2 RA and an example of resource allocation thereof.

Hereinafter, resource allocation defined in legacy LTE will be described referring to FIG. 6 to FIG. 9. FIG. 6, FIG. 7 and FIG. 8 illustrate control information formats for Type 0 resource allocation (RA), Type 1 RA, and Type 2 RA and examples of resource allocation thereof, respectively. FIG. 9 illustrates a table used for start position and length determination in Type 2.

A UE interprets a resource allocation field based on a detected PDCCH DCI format. The resource allocation field in each PDCCH includes two parts: a resource allocation header field and actual RB assignment information. PDCCH DCI formats 1, 2, and 2A for Type 0 and Type 1 RA have the same format and are distinguished by a single-bit resource allocation header field which is present according to DL system bandwidth. Specifically, Type 0 RA is indicated by 0 and Type 1 RA is indicated by 1. While PDCCH DCI formats 1, 2, and 2A are used for Type 0 or Type 1 RA, PDCCH formats 1A, 1B, 1C, and 1D are used for Type 2 RA. A PDCCH DCI format having Type 2 RA does not include a resource allocation header field. The resource allocation field indicates a PRB set of the first slot. Since slot hopping does not exist between the first slot and the second slot in the case of RA Type 0, Type 1, and Type 2-LVRB, which will be described later, the same PRB set as in the first slot is allocated in the second slot (i.e. PRB index (of the first slot)=PRB index (of the second slot)). Meanwhile, in the case of RA Type 2-DVRB, if the PRB set of the first slot is given, the PRB set of the second slot is determined by a slot hopping rule.

Referring to FIG. 6, in Type 0 RA, RB assignment information includes a bitmap indicating an RBG allocated to a UE. The RBG is a set of consecutive PRBs. The size of the RBG, P, depends upon system bandwidth as follows.

TABLE 5

| System Bandwidth $N_{RB}^{DL}$ | RBG Size (P) |
|---|---|
| ≤10 | 1 |
| 11-26 | 2 |
| 27-63 | 3 |
| 64-110 | 4 |

In DL system bandwidth having $N^{DL}_{RB}$ PRBs, a total number of RBGs, $N_{RBG}$, is given by $N_{RBG}=\text{ceil}(N^{DL}_{RB}/P)$, the size of floor($N^{DL}_{RB}/P$) RBGs is P, and the size of one RBG is $N^{DL}_{RB}-P \cdot \text{floor}(N^{DL}_{RB}/P)$ when $N^{DL}_{RB}$ mod P>0. Here, mod indicates a modulo operation. The size of a bitmap is $N_{RBG}$ and each bit corresponds to one RBG. All RBGs are indexed 0 to $N_{RBG}-1$ in a frequency increase direction and RBG 0 to RBG $N_{RBG}-1$ are mapped from a most significant bit (MSB) to a least significant bit (LSB) of the bitmap. The RBG is allocated to the UE if the corresponding bit value in the bitmap is 1, the RBG is not allocated to the UE otherwise.

Referring to FIG. 7, in Type 1 RA, RB assignment information having the size of $N_{RBG}$ informs a scheduled UE of resources in an RBG subset in PRB units. An RBG subset p (0≤p<P) consists of every P-th RBG starting from an RBG p. The RB assignment information includes three fields. The first field has ceil{$\log_2(P)$} bits and indicates an RBG subset selected from among P RBG subsets. The second field has one bit and indicates shift of a resource assignment span within a subset. The shift is triggered when a bit value is 1 and is not triggered when a bit value is not 1. The third field includes a bitmap and each bit indicates one PRB within a selected RBG set. The size of a bitmap part used to indicate a PRB within the selected RBG subset is $N^{TYPE1}_{RB}$ and is defined as follows.

$$N_{RB}^{TYPE1}=\lceil N_{RB}^{DL}/P \rceil - \lceil \log_2(P) \rceil - 1 \qquad \text{[Equation 2]}$$

An addressable PRB number in a selected RBG subset may start from an offset $\Delta_{shift}(p)$ from the smallest PRB number within the selected RBG subset and may be mapped to the MSB of a bitmap. The offset is expressed by the number of PRBs and is applied within the selected RBG subset. When the bit value within the second field for shift of the resource assignment span is set to 0, an offset for an RBG subset p is given as $\Delta_{shift}(p)=0$. In the other cases, the offset for the RBG subset p is given as $\Delta_{shift}(p)=N^{RBGsubset}RB(p)-N^{TYPE1}_{RB}$. $N^{RBGsubset}_{RB}(p)$ denotes the number of PRBs within the RBG subset p and may be obtained as follows.

$$N^{RBG\ subset}_{RB}(p) = \begin{cases} \left\lfloor \frac{N^{DL}_{RB}-1}{P^2} \right\rfloor \cdot P + P, & p < \left\lfloor \frac{N^{DL}_{RB}-1}{P} \right\rfloor \bmod P \\ \left\lfloor \frac{N^{DL}_{RB}-1}{P^2} \right\rfloor \cdot P + (N^{DL}_{RB}-1)\bmod P + 1, & p = \left\lfloor \frac{N^{DL}_{RB}-1}{P} \right\rfloor \bmod P \\ \left\lfloor \frac{N^{DL}_{RB}-1}{P^2} \right\rfloor \cdot P, & p > \left\lfloor \frac{N^{DL}_{RB}-1}{P} \right\rfloor \bmod P \end{cases}$$

[Equation 3]

Consequently, when RBG subset p is indicated, bit i for i=0, 1, . . . , $N^{TYPE1}_{RB}-1$ in the bitmap field indicates a following VRB number.

$$n^{RBG\ subset}_{VRB}(p) = \left\lfloor \frac{i + \Delta_{shift}(p)}{P} \right\rfloor P^2 + p \cdot P + (i + \Delta_{shift}(p))\bmod P$$

[Equation 4]

Referring to FIG. 8, in Type 2 RA, RB assignment information indicates a set of LVRBs or DVRBs consecutively allocated to a scheduled UE. If resource assignment is signaled in PDCCH DCI format 1A, 1B, or 1D, a 1-bit flag indicates whether an LVRB or DVRB is allocated (e.g. 0 denotes LVRB assignment and 1 denotes DVRB assignment). In contrast, if resource assignment is signaled in PDCCH DCI format 1C, only a DVRB is always allocated. A Type 2 RA field includes a resource indication value (RIV) and the RIV corresponds to a start RB $RB_{start}$ and length. The length denotes the number of virtually and consecutively allocated RBs.

For example, referring to FIG. 9, RIV=47 means that a total of four RBs are allocated starting from an RB of which VRB index is 2.

Figure 10:
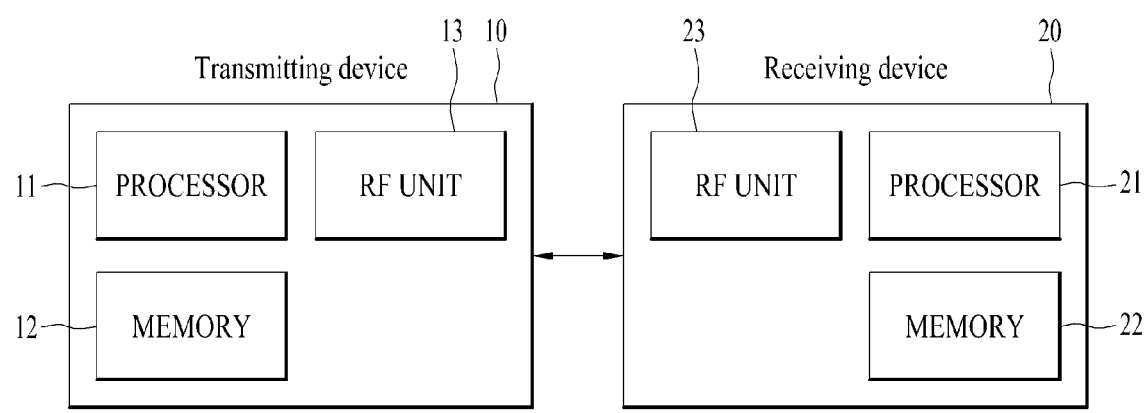
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL.

Figure 11:
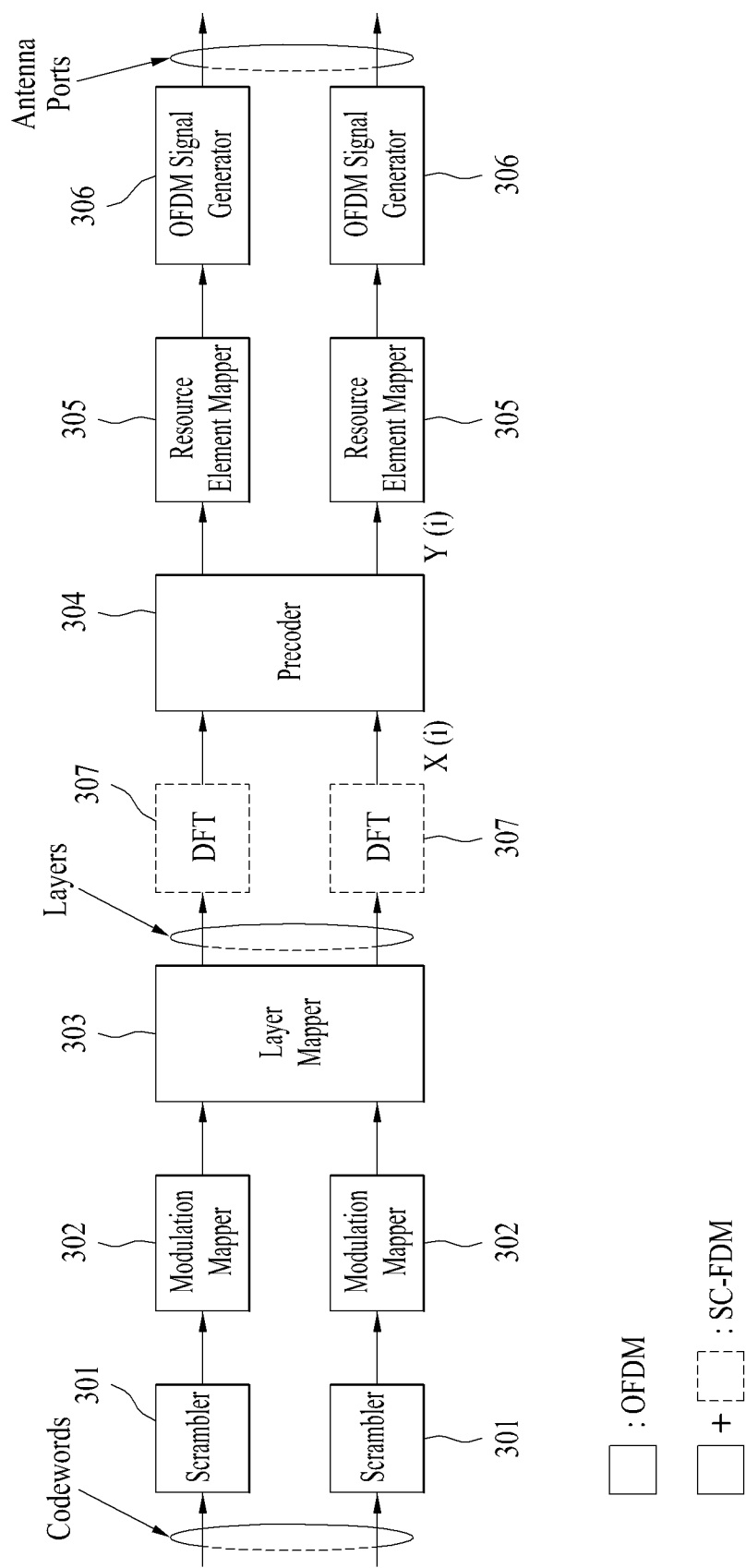
FIG. 11 illustrates an overview of physical channel processing.

FIG. 11 illustrates an overview of physical channel processing. A baseband signal representing a PUSCH or a PDSCH may be defined by a processing procedure of FIG. 11.

Referring to FIG. 11, a transmitting device may include scramblers 301, modulation mappers 302, a layer mapper 303, a precoder 304, RE mappers 305, and OFDM signal generators 306.

The transmitting device 10 may transmit more than one codeword. The scramblers 301 scramble the coded bits of each codeword, for transmission on a physical channel.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-phase shift keying (m-PSK) and m-quadrature amplitude modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. Here, $N_t$ is corresponding to the number of transmission antennas, and $M_t$ is corresponding the number of layers. Since the precoder 304 is differently configured according to the precoding matrix, if the same precoding matrix is applied to signals, this indicates that the same precoder is applied to signals in the present invention and if different precoding matrices are applied to signals, this indicates that different precoders are applied to signals in the present invention.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to UEs.

The OFDM signal generators 306 modulate the complex-valued modulation symbols for the respective antenna ports, that is, the antenna-specific symbols through OFDM or SC-FDM modulation, thereby producing a complex-valued time domain orthogonal frequency division multiplexing (OFDM) or single carrier frequency division multiplexing (SC-FDM) symbol signal. The OFDM signal generators 306 may perform inverse fast Fourier transform (IFFT) on the antenna-specific symbols and insert a cyclic prefix (CP) into the resulting IFFT time domain symbol. Digital-to-analog conversion, frequency upconversion, etc applied to the OFDM symbol and then transmitted through the transmission antennas to a receiving device 20. The OFDM signal generators 306 may include an IFFT module, a CP inserter, a digital-to-analog converter (DAC), a frequency upconverter, etc.

In the meantime, if the UE or eNB applies the SC-FDMA scheme to codeword transmission, the transmitter or processor may include a discrete Fourier transform (DFT) module 307 (or fast Fourier transform (FFT) module). The DFT module 307 performs DFT or FFT (hereinafter referred to as DFT/FFT) on the antenna specific symbol, and outputs the DFT/FFT symbol to the resource element mapper 305.

The receiving device 20 operates in the reverse order to the operation of the transmitting device 10. Specifically, the receiving device may include a signal recoverer for recovering a received signal into a baseband signal, a multiplexer for multiplexing a received and processed signal, and a channel demodulator for demodulating a multiplexed signal stream into a codeword. The signal recoverer, the multiplexer, and the channel demodulator may be comprised of one integrated module or independent modules for performing respective functions. For example, the signal recoverer may include an analog-to-digital converter (ADC) for converting an analog signal into a digital signal, a CP remover for removing a CP from the digital signal, an FFT module for generating a frequency-domain symbol by performing FFT upon the CP-removed signal, and an RE demapper/equalizer for recovering the frequency-domain symbol into an antenna-specific symbol. The multiplexer recovers the antenna-specific symbol into a transmission layer and the channel demodulator recovers the transmission layer into the codeword that the transmitting device desires to transmit.

Meanwhile, upon receiving signals transmitted by an SC-FDMA scheme, the receiving device 20 further includes an inverse discrete Fourier transmission (IFFT) module (or an inverse fast Fourier transform (IFFT) module). The IDFT/IFFT module performs IDFT/IFFT upon the antenna-specific symbols recovered by the RE demapper and transmits the IDFT/IFFT-processed symbol to the multiplexer.

For reference, the processor 11 of the transmitting device 10 in FIG. 10 may be configured to include the scramblers 301, the modulation mappers 302, the layer mapper 303, the precoder 304, the RE mappers 305, and the OFDM signal generators 306. Likewise, the processor 21 of the receiving device 20 in FIG. 10 may be configured to include the signal recoverer, the multiplexer, and the channel demodulator.

In order for the receiving device 20 to restore a signal transmitted by the transmitting device 10, an RS for estimating a channel between the receiving device and the transmitting device is needed. RSs may be categorized into RSs for demodulation and RSs for channel measurement. CRSs defined in the 3GPP LTE system can be used for both demodulation and channel measurement. A dedicated RS (DRS) is known only to a specific UE and the CRS is known to all UEs. Among RSs defined in the 3GPP LTE-A system, the cell-specific RS may be considered a sort of the common RS.

Figure 12:
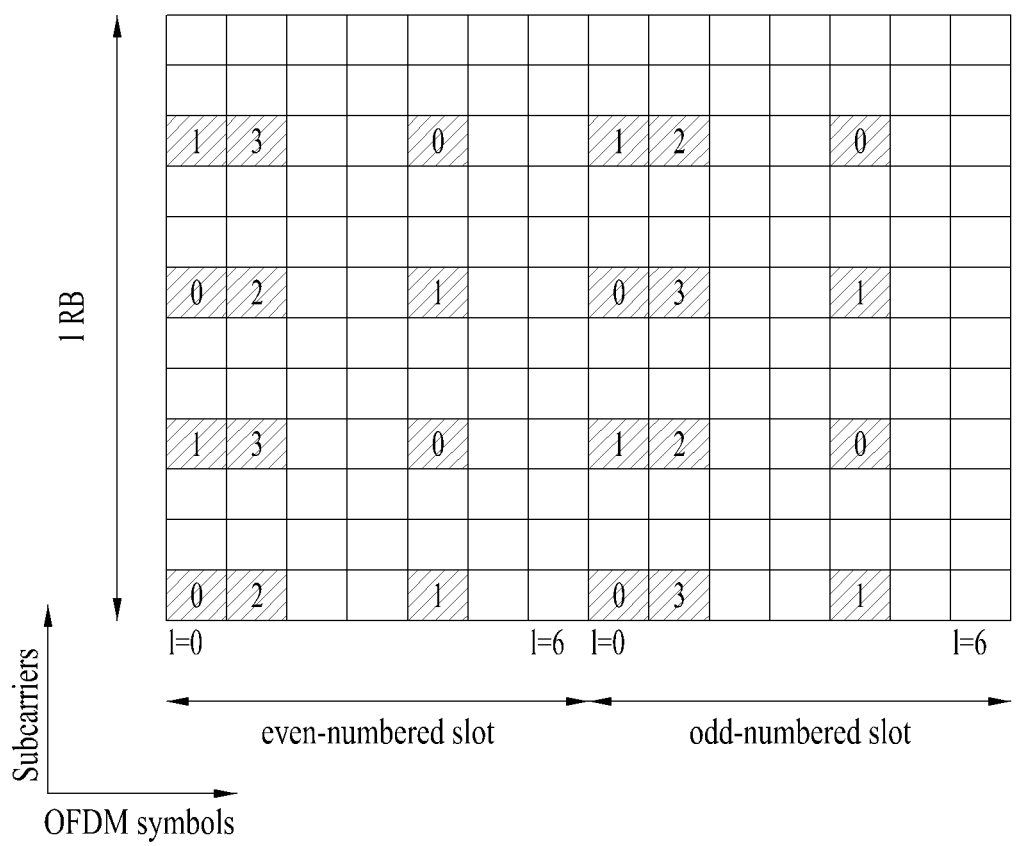
FIG. 12 illustrates configuration of cell specific reference signals (CRSs).

FIG. 12 illustrates configuration of cell specific reference signals (CRSs). Especially, FIG. 12 illustrates configuration of CRSs for a 3GPP LTE system supporting a maximum of four antennas.

Since CRSs are used for both demodulation and measurement, the CRSs are transmitted in all DL subframes in a cell supporting PDSCH transmission and are transmitted through all antenna ports configured for an eNB. A UE may measure CSI using the CRSs and demodulate a signal received on a PDSCH in a subframe including the CRSs. For reference, since demodulation is a part of a decoding process, the term demodulation in embodiments of the present invention is used interchangeably with decoding.

More specifically, CRS sequence $r_{l,n_s}(m)$ is mapped to complex-valued modulation symbols $a_{k,l}^{(p)}$ used as reference symbols for antenna port p in slot $n_s$ according to the following equation.

$$a_{k,l}^{(p)} = r_{l,n_s}(m') \quad \text{[Equation 5]}$$

In Equation 5, $n_s$ is the slot number in a radio frame, and l is the OFDM symbol number within the slot, which is determined according to the following equation.

$$k = 6m + (v + v_{shift}) \bmod 6 \quad \text{[Equation 6]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

In Equation 6, k denotes a subcarrier index, l denotes an OFDM symbol index, and $N_{RB}^{max,DL}$ denotes the largest DL bandwidth configuration, expressed as an integer multiple of $N_{sc}^{RB}$.

Parameters v and $v_{shift}$ define locations for different RSs in the frequency domain and v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 7]}$$

The cell-specific frequency $v_{shift}$ is given by a physical layer cell identity $N_{ID}^{cell}$ as follows.

$$v_{shift} = N_{ID}^{cell} \bmod 6 \quad \text{[Equation 8]}$$

MIMO operation using multiple transmit/receive antennas may be broadly categorized into closed-loop MIMO and open-loop MIMO. In closed-loop MIMO, the UE measures a channel from the eNB and reports an optimal precoding matrix selected from the measured channel to the eNB and then the eNB performs MIMO transmission based on the reported precoding matrix. In open-loop MIMO, the eNB performs MIMO transmission by selecting a precoding matrix without feedback operation of the UE for information about the precoding matrix to the eNB. Generally, closed-loop MIMO exhibits better signal transmission performance than open-loop MIMO when CSI is reliable. However, closed-loop MIMO requires CSI feedback overhead relative to open-loop MIMO that does not entail feedback and even deteriorates signal transmission performance in a situation in which the CSI is not reliable as in a situation in which the UE moves fast. On the other hand, open-loop MIMO does not require that the eNB additionally receive the information about the precoding matrix from the UE and thus has an advantage of providing stable signal transmission performance regardless of a channel state between the eNB and the UE.

In open-loop MIMO, the eNB cannot be informed of information associated with the precoding matrix for the UE by the UE. One method for the eNB and the UE to operate in open-loop MIMO is a precoder cycling scheme in which the eNB cyclically applies prescribed precoders to respective REs according to a predetermined rule. For example, the eNB transmits RSs through $N_{RS}$ antenna ports and the UE estimates a channel from the antenna ports participating in RS transmission by using the RSs and then detects a data signal of the k-th RE under the assumption that precoding matrix PM(k) is applied to the k-th RE based on a corresponding RS.

In a conventional system, a CRS which can be monitored by all UEs belonging to a corresponding cell has been used as an RS referenced in such precoder cycling. That is, the eNB transmits CRSs to uniform positions in each RB in all RBs and the UE performs channel estimation based on the CRSs and then detects a PDSCH. For example, the UE may measure a signal received on a CRS RE and detect a PDSCH signal from an RE to which the PDSCH is mapped by using the measured signal and the ratio of reception energy per CRS RE to reception energy per RE to which the PDSCH is mapped. However, in the case in which the PDSCH is transmitted based on the CRSs, since the eNB should transmits the CRSs in all RBs, unnecessary RS overhead occurs.

To solve this problem, a UE-specific RS (hereinafter, UE-RS) and a CSI-RS are further defined in addition to a CRS in a 3GPP LTE-A system. The UE-RS is used for demodulation and the CSI-RS is used to derive CSI. The UE-RS is one type of a DRS.

Figure 13:
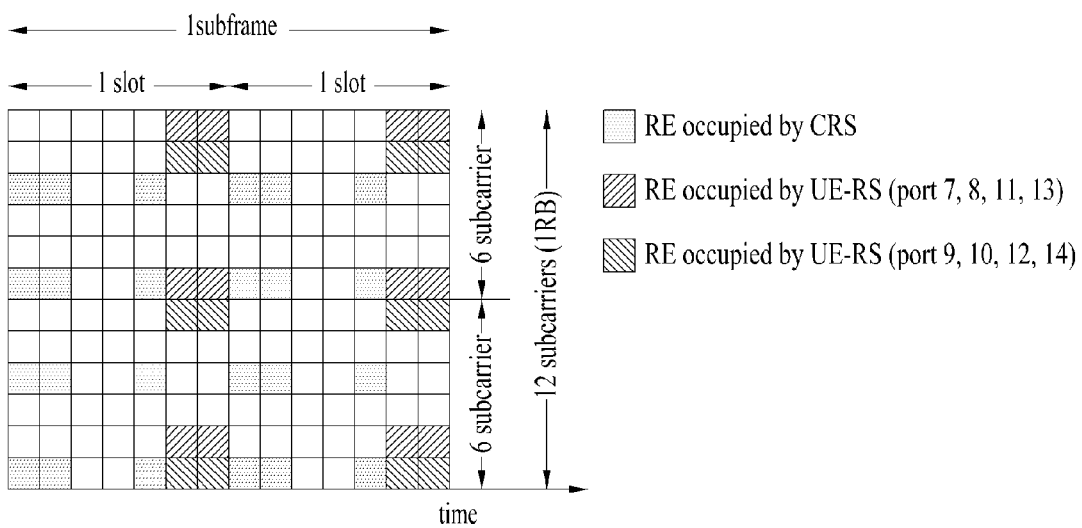
FIG. 13 illustrates UE-specific reference signals (UE-RSs).

FIG. 13 illustrates UE-specific reference signals (UE-RSs). In more detail, FIG. 13 illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present.

In the 3GPP LTE-A system, the UE-RSs are defined in a PRB pair. Referring to FIG. 13, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3' \cdot n_{PRB} + m')$$ [Equation 9]

In Equation 9, $w_p(i)$, l', m' are given as follows.

[Equation 10]

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

In Equation 10, the sequence $\overline{w}_p(i)$ for normal CP is given according to the following equation.

TABLE 6

| Antenna port p | $[\overline{w}_p(0)\ \overline{w}_p(1)\ \overline{w}_p(2)\ \overline{w}_p(3)]$ |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port $p \in \{7, 8, \ldots, \upsilon+6\}$, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)),$$ [Equation 11]

$$m = \begin{cases} 0, 1, \ldots, 12M_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence. The pseudo-random sequence generator for generating c(i) is initialized with $c_{init}$ at the start of each subframe according to the following equation.

$$c_{init} = (\lfloor n_s/2 \rfloor + 1) \cdot (2N_{ID}^{cell} + 1) \cdot 2^{16} + n_{SCID}$$ [Equation 12]

where $n_{SCID}$ is 0 unless specified otherwise and is given by DCI format 2B or 2C associated with PDSCH transmission with respect to PDSCH transmission on antenna port 7 or 8. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

As can be appreciated from Equation 9 to Equation 12, UE-RSs are transmitted over antenna port(s) corresponding respectively to layer(s) of the PDSCH. That is, according to Equation 9 to Equation 12, the number of UE-RS ports is proportional to the transmission rank of the PDSCH.

As described above, since UE-RSs are transmitted only in an RB to which a PDSCH is mapped for a specific UE, RS overhead decreases as opposed to CRSs transmitted throughout all bands. Accordingly, the present invention proposes data transmission/reception using the UE-RSs instead of the CRSs in open-loop MIMO.

Figure 14:
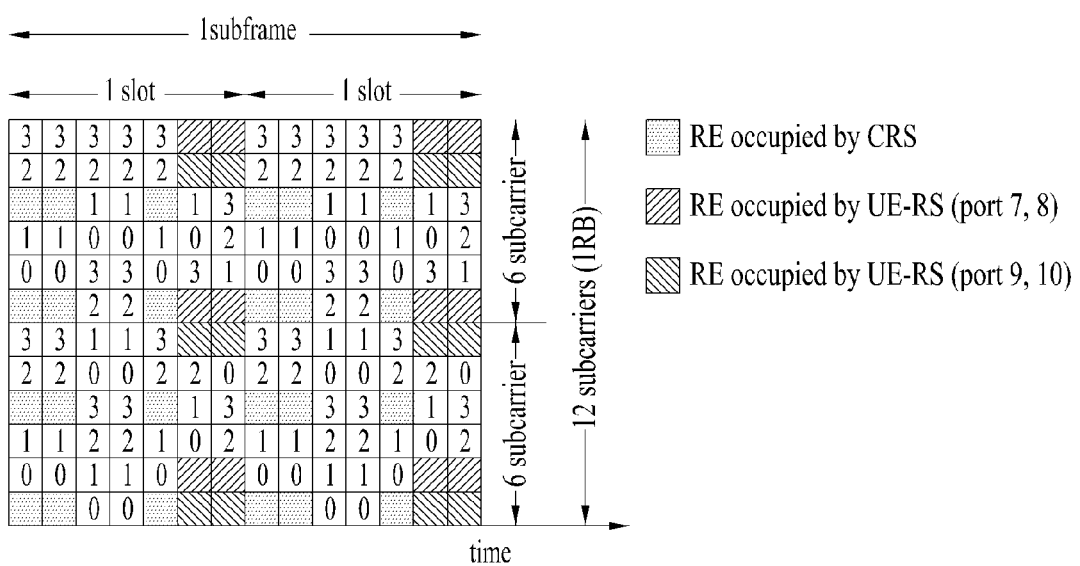
FIG. 14 illustrates precoder(s) applied to downlink data according to an embodiment of the present invention.

FIG. 14 illustrates precoder(s) applied to DL data according to an embodiment of the present invention. Especially, FIG. 14 illustrates a PDSCH transmission scheme in which a different precoder per RE is applied using RSs of antenna ports 7, 8, 9, and 10.

In FIG. 14, it may be assumed that precoders W0, W1, W2, and W3 are respectively applied to REs denoted by numbers "0", "1", "2", and "3".

Hereinafter, PDSCH transmission using open-loop MIMO in which a precoder varies with an RE according to embodiments of the present invention will be described.

<A. Method for Setting the Number of Antenna Ports for UE-RSs>

In order to estimate a PDSCH using UE-RS(s), a UE should be aware of the number of UE-RS ports participating in transmission of the UE-RS(s). For instance, the UE decodes the PDSCH by assuming that the ratio of energy per UE-RS RE to energy per RE occupied by the PDSCH (hereinafter, data RE) in a PRB to which the PDSCH is mapped is a specific value. This is because energy per RE (EPRE) relates to one antenna port and if the number of UE-RS ports is unknown, energy per UE-RS RE cannot be calculated and the PDSCH cannot also be decoded even when a signal is received on a UE-RS RE.

In the present invention, the number of UE-RS ports is determined according to a (transmission) rank, which is the number of layers to which a PDSCH is mapped, or a rank, which can be received by the UE and is obtained by the UE using RSs for channel measurement. Namely, the present invention proposes methods for configuring the number of UE-RS ports on the premise that transmission rank R of the PDSCH may differ from the number of UE-RS ports, as opposed to description in Equations 9 to 12. If the rank of the PDSCH is given as R, precoding for UE-RSs can be normally applied only when the UE-RSs are transmitted over at least R antenna ports. Transmission rank R of the PDSCH may be provided to the UE on a PDCCH carrying DCI for scheduling of the PDSCH. In other words, the DCI for scheduling of the PDSCH may include a field regarding the transmission rank of the PDSCH. Meanwhile, if the UE-RSs are transmitted over more antenna ports than the R antenna ports, diversity gain in the antenna domain may be obtained. The present invention proposes methods for determining the number of UE-RS ports by taking these characteristics into account.

Method A-1) Use of a Fixed Number of UE-RS Ports

According to Method A-1 of the present invention, UE-RSs are transmitted over a predetermined number of antenna ports irrespective of transmission rank R of the PDSCH. An eNB may inform the UE, for which open-loop MIMO transmission is configured, of the number of antenna ports over which the UE-RSs are transmitted through a higher layer signal such as a radio resource control (RRC) signal.

Method A-2) Setting/Determination of Number of UE-RSs Linked with CSI-RSs

The UE for which open-loop MIMO as described above is configured calculates the RI and/or the CQI and reports the calculated RI and/or CQI to the eNB under the assumption that the eNB cyclically uses a precoder per RE. Such RI/CQI calculation may be performed based on a CSI-RS. The CSI-RS is a DL RS introduced in the 3GPP LTE-A system, not for demodulation but for channel measurement. In the 3GPP LTE-A system, a plurality of CSI-RS configurations is defined for CSI-RS transmission. In subframes in which CSI-RS transmission is configured, CSI-RS sequence $r_{l,n_s}(m)$ is mapped to complex-valued modulation symbols $a_{k,l}^{(p)}$ used as RSs on antenna port p according to the following equation.

$$a_{k,l}^{(p)} = w_{l''} \cdot r_{l,n_s}(m') \quad \text{[Equation 13]}$$

In Equation 13, $w_{l''}, k, l$ are given by the following equation.

where (k', l') and necessary conditions on $n_s$ are given by Table 7 and Table 8 in a normal CP and an extended CP, respectively. That is, CSI-RS configurations of Table 7 and Table 8 denote locations of REs occupied by a CSI-RS of each antenna port in an RB pair.

TABLE 7

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| FS1 and FS2  0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| FS2 only  20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

[Equation 14]

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

TABLE 7-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 29 | (2, 1) | 1 | | | | |
| 30 | (1, 1) | 1 | | | | |
| 31 | (0, 1) | 1 | | | | |

TABLE 8

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 15:
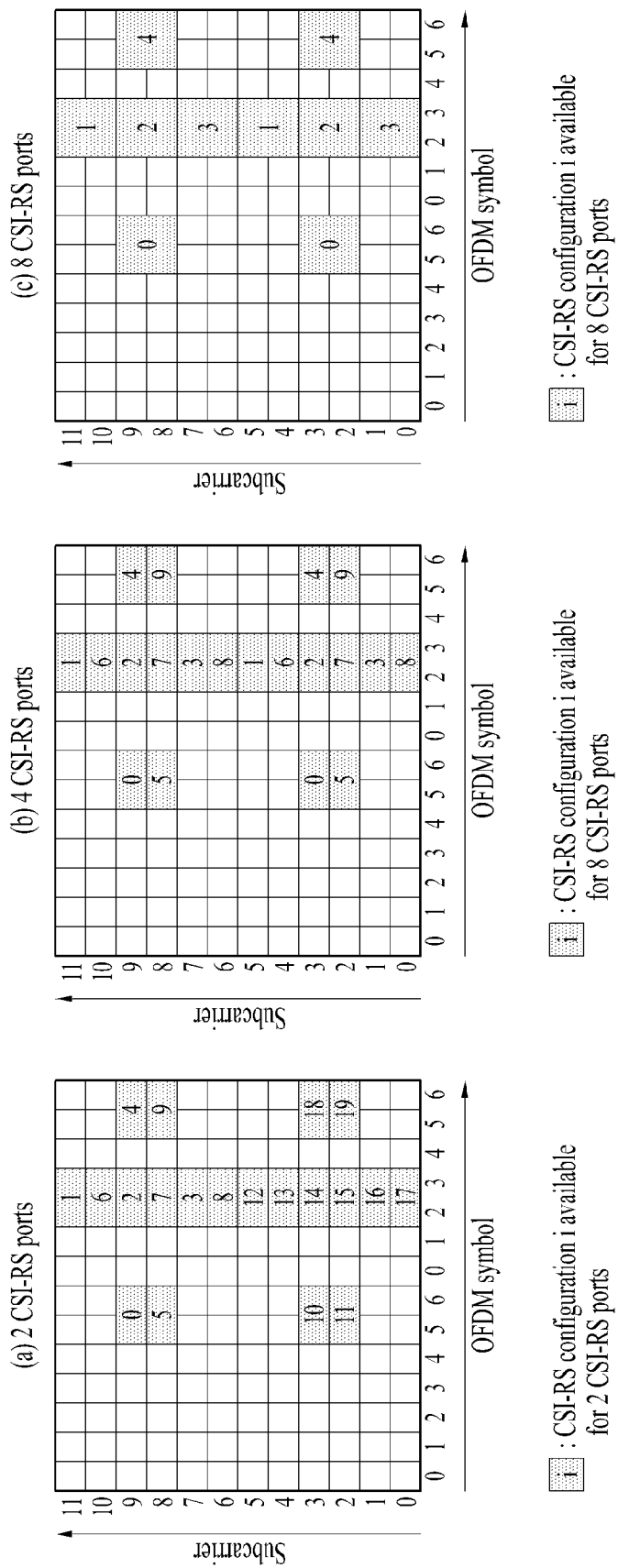
FIG. 15 illustrates channel state information reference signal (CSI-RS) configurations.

FIG. 15 illustrates CSI-RS configurations. Particularly, FIG. 15(a) illustrates 20 CSI-RS configurations 0 to 19 available for CSI-RS transmission through two CSI-RS ports among the CSI-RS configurations of Table 7, FIG. 15(b) illustrates 10 available CSI-RS configurations 0 to 9 through four CSI-RS ports among the CSI-RS configurations of Table 7, and FIG. 15(c) illustrates 5 available CSI-RS configurations 0 to 4 through 8 CSI-RS ports among the CSI-RS configurations of Table 7. The CSI-RS ports refer to antenna ports configured for CSI-RS transmission. For example, referring to Equation 14, antenna ports 15 to 22 correspond to the CSI-RS ports. Since CSI-RS configuration differs according to the number of CSI-RS ports, if the numbers of antenna ports configured for CSI-RS transmission differ, even the same CSI-RS configuration number corresponds to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 7 or Table 8 but also with subframes in which CSI-RSs are configured. That is, if subframes for CSI-RS transmission differ even when CSI-RS configuration numbers are the same in Table 8 or Table 9, CSI-RS configurations also differ. For example, if CSI-RS transmission periods differ or if start subframes in which CSI-RS transmission is configured in one radio frame differ, this may be considered as different CSI-RS configurations. Hereinafter, in order to distinguish a CSI-RS configuration varying with a CSI-RS configuration number of Table 7 or Table 8, the number of CSI-RS ports, and a subframe in which a CSI-RS is configured from a CSI-RS configuration to which a CSI-RS configuration number of Table 7 or Table 8 is assigned, the CSI-RS configuration according to Table 7 or Table 8 will be referred to as a CSI-RS pattern in consideration of the fact that REs occupied by CSI-RSs are designated within an RB in Table 7 or Table 8.

The UE of the present invention may perform channel estimation using the CSI-RSs and demodulate or decode the PDSCH using the UE-RSs. Generally, a CSI-RS port is relevant to UE-RS port. The CSI-RS port and the UE-RS port for a specific UE have a high probability of being configured by the same or similar antenna port(s) because antenna ports used by the eNB to configure CSI-RS ports also have a high probability of being used to configure UE-RS ports. In consideration of this fact, Method A-2 of the present invention configures the number of UE-RS ports by linking it with the number of CSI-RS ports defined to calculate CSI. For example, the number of UE-RS ports may be set to be identical to the number of CSI-RS ports defined to calculate the CSI for the PDSCH. As another example, since open-loop MIMO is mainly used for a UE having a bad channel state or having a greatly changed channel state, there is little possibility that a very high transmission rank is provided to the UE for which open-loop MIMO is configured. If the UE is configured to use many CSI-RS ports (e.g. 8 CSI-RS ports), the number of UE-RS ports may be set to a number (e.g. 4) which is less than the number of UE-RS ports in order to prevent the UE from estimating the PDSCH with respect to many antenna ports.

In Method A-2 of the present invention, the number of UE-RS ports may be set to be same as the number of CSI-RS ports in principle. However, in order to prevent channel estimation for too many UE-RS ports, the number of UE-RS ports may be restricted so as not to exceed a predetermined upper limit value. The upper limit value of the number of UE-RS ports may be fixed regardless of the transmission rank of the PDSCH or may be set to a maximum value of the transmission rank which can be received by the UE because channel estimation for antenna ports exceeding a (maximum) transmission rank which can be received by the UE may cause excessively complicated operation. The maximum rank which can be received by the UE may be acquired by the UE based on CSI-RSs.

Meanwhile, when the UE is configured for a mode for receiving the PDSCH through coordination among a plurality of transmission points, that is, for a CoMP mode, the UE may be configured to report CSI for one or more CSI-RS configurations. In more detail, when the UE is configured for a transmission mode corresponding to CoMP, for example, transmission mode 10, the UE may receive a plurality of CSI-RS configurations as well as one CSI-RS configuration and may be configured to report a plurality of CSI using the one or plural CSI-RSs. As described above, the CSI-RS configurations may differ according to any one of a CSI-RS pattern, the number of CSI-RS ports, and a subframe in which a CSI-RS is configured. In the present invention, if transmission points participating in CoMP have different radio characteristics, different CSI-RS configurations may be used for the respective transmission points and it is assumed that a channel is estimated from the transmission points corresponding respectively to the different CSI-RS configurations using the different CSI-RS configurations.

When the UE receives a plurality of CSI-RS configurations as well as one CSI-RS configuration, which CSI-RS configuration among the one or more CSI-RS configurations is to be used to set the number of UE-RS ports needs to be determined. This is because the UE and the eNB are capable of assuming UE-RS ports based on the number of CSI-RS ports according to the same CSI-RS configuration only after a CSI-RS configuration to be used to determine the UE-RS ports is determined.

For instance, the eNB may designate a reference CSI-RS configuration for determining the number of UE-RS ports through a higher layer signal such as an RRC signal. Alternatively, one of the one or more CSI-RS configurations, for example, a CSI-RS configuration corresponding to a lowest CSI-RS configuration number may be predetermined as a CSI-RS configuration capable of being used to set the number of UE-RS ports. As an alternative definition, the number of UE-RS ports may be configured or determined based on a maximum value among the numbers of CSI-RS ports corresponding to the one or more CSI-RS configurations. This is advantageous in that a maximum transmission rank may be provided even though a transmission point corresponding to any CSI-RS configuration among one or more CSI-RS configurations transmits a PDSCH. In contrast, the number of UE-RS ports may be defined to be set or determined based on a lowest value among the numbers of CSI-RS ports corresponding to the one or more CSI-RS configurations. This case has an advantage of minimizing channel estimation using UE-RSs regardless of which transmission point actually transmits the PDSCH. Alternatively, the number of UE-RS ports may be set or determined based on the sum of the numbers of antenna ports of the one or more CSI-RS configurations. This is advantageous in that a transmission rank in JT in which a plurality of transmission points participate in transmission of a single PDSCH may not be restricted to a value less than the transmission rank of one transmission point.

Method A-3) Setting/Determination of the Number of UE-RS Ports Linked to the Transmission Rank of a PDSCH As described with reference to FIG. 12, overhead of RSs occupied by UE-RSs depends on the number of UE-RS ports. Notably, even in this case, RS overhead increases only when the number of UE-RS ports exceeds a predetermined threshold. For example, referring to FIG. 12, if one or two UE-RS ports are used for UE-RS transmission, UE-RS overhead becomes 12 REs in one PRB pair, whereas, if three or more antenna ports are used for UE-RS transmission, UE-RS overhead increases to 24 REs in one PRB pair. Accordingly, the number of UE-RS ports is set to be greater than or equal to the transmission rank of the PDSCH and as many antenna ports as possible may be set for UE-RS transmission may within the range of not increasing RS overhead. For example, if the transmission rank of the PDSCH is 1 or 2, UE-RSs may be transmitted using two antenna ports and, if the transmission rank of the PDSCH is 3 or more, M (>2) UE-RS ports may be used for UE-RS transmission. Here, M may be set or determined using one of the following methods.

Method A-3.1) Setting of M to be the Same as the Transmission Rank of a PDSCH

If the transmission rank of the PDSCH is 3 or more, antenna diversity through selection of a precoder may not greatly affect PDSCH performance. Therefore, in Method A-3.1 of the present invention, M may be set to be the same as the transmission rank of the PDSCH in order to reduce complexity of channel estimation by the UE.

Method A-3.2) Setting of M to a Predetermined Value, for Example, 4 or 8

According to Method A-3.2 of the present invention, diversity gain can be obtained through cycling of a precoder even when the transmission rank of the PDSCH increases. M may be set using the same scheme as described in Method A-1 and Method A-2.

Method A-3.3) Setting of M to 4 when the Transmission Rank of the PDSCH is 3 or 4 and to 5 when the Transmission Rank of the PDSCH is 5 or More Method A-3.3 may be interpreted as a hybrid of Method A-3.1 and Method A-3.2. In Method A-3.3, some antenna diversity can be obtained in spite of a high PDSCH transmission rank and simultaneously, if UE-RSs are transmitted over four or fewer antenna ports, RSs may be distinguished only by two REs to which contiguous UE-RSs on OFDM symbols are allocated. This is because RSs are code division multiplexed using an orthogonal sequence of spreading factor (SF) 2. On the other hand, if 5 or more antenna ports participate in UE-RS transmission, channel estimation using UE-RSs can be performed only when OFDM symbols including four RSs are all used due to properties of UE-RSs code division multiplexed on all of four OFDM symbols belonging to the same subcarrier. Especially, when channel variation between OFDM symbols is severe due to rapid moving speed of the UE, PDSCH transmission may not be smoothly performed. In this case, if Method A-3.3 of the present invention is applied, a DL channel can be more effectively estimated.

Method A-4) Setting/Determination of the Number of UE-RS Ports Through DCI

In Method A-4 of the present invention, the number of UE-RS ports is set or determined using a specific indicator included in a physical layer control message for scheduling PDSCH transmission, such as DCI carried by the PDCCH. The specific indicator may be a field directly indicating the number of UE-RS ports. Alternatively, the number of UE-RS ports may be indicated in association with a field used for another purpose. For example, the number of UE-RS ports may be set or determined in linkage with RS scrambling sequence initialization parameter $n_{SCID}$ of the PDSCH. Specifically, an RS scrambling sequence initialization parameter such as a virtual cell ID may be differently assigned to each transmission point for dynamic transmission point selection in which a transmission point transmitting the PDSCH is dynamically changed in a specific subframe based on CSI for a plurality of transmission points. In addition, an actually used virtual cell ID and RS scrambling initialization may be finally determined according to another RS scrambling sequence initialization parameter $n_{SCID}$ included in the DCI. In this case, the number of UE-RS ports may be set/determined according to a transmission point selected by $n_{SCID}$ or a CSI-RS configuration associated with $n_{SCID}$. As an example, the number of UE-RS ports per $n_{SCID}$ is previously (semi-statically) designated through a higher layer signal such as an RRC signal and the number of UE-RS ports actually used for UE-RS transmission associated with the PDSCH may be (dynamically) set/determined by designating $n_{SCID}$ in the DCI whenever PDSCH scheduling is performed by the DCI. As another example, a CSI-RS configuration per $n_{SCID}$ may be previously (semi-statically) designated through a higher layer signal such as an RRC signal and the number of UE-RS ports actually used for UE-RS transmission may be (dynamically) set/determined by designating $n_{SCID}$ for scheduling of every PDSCH. In this case, the dynamically designated CSI-RS configuration, i.e. the CSI-RS configuration linked with $n_{SCID}$ set in the DCI, may be used as the reference CSI-RS configuration for determining the number of UE-RS ports described in Method A-2 of the present invention.

<B. UE-RS Based Channel Estimation>

Next, UE-RS channel estimation methods according to the present invention are proposed. For reference, the number of UE-RS ports assumed in the UE-RS channel estimation methods may be set/determined according to any one of the above-described Method A-1 to Method A-4.

Since closed-loop MIMO requires feedback of a PMI, feedback overhead greatly increases if a different PMI needs to be fed back according to a PRB. In addition, since frequency selectivity is limited between contiguous PRBs, PRB bundling for causing the UE to estimate channel states of the contiguous PRBs as well under the assumption that the same precoder is applied to UE-RSs of the contiguous PRBs is effective in closed-loop MIMO. That is, for PDSCH transmission to the UE for which closed-loop MIMO is configured, the same precoder may be applied to contiguous PRBs to which PDSCHs are mapped. Such PRB bundling is meaningful only when PMI/RI feedback is configured for the UE. This is because it is preferable to apply the same precoder to contiguous PRBs since the UE in closed-loop MIMO generally reports one PMI to a plurality of contiguous PRBs, whereas an additional precoder per PRB may be applied when the eNB can calculate a PMI using a UL signal such as an SRS even without feedback of PMI/RI from the UE.

For example, if PMI feedback is configured for the UE, the present invention may be interpreted as setting of closed-loop MIMO operation for the UE and, in this case, the UE may assume that the same precoder is applied to contiguous PRBs scheduled for data transmission to the UE and thus decode data received in the contiguous PRBs. In other words, according to the present invention, if closed-loop MIMO operation is configured, the UE may assume that precoders applied to UE-RSs on a prescribed number of PRBs for PDSCH transmission to the UE are equal and estimate a DL channel corresponding to a PDSCH by using the UE-RSs. In more detail, the UE configured for transmission mode 9 for given serving cell CC c may assume that precoding granularity is multiple resource blocks when PMI/RI feedback is configured. Fixed system bandwidth-dependent precoding resource block groups (PRGs) of size P' partition system bandwidth and each PRG consists of consecutive PRBs. If $N^{DL}_{RB}$ mod P'>0, then one of the PRGs has a size of $N_{RB}^{DL}-P'\lfloor N_{RB}^{DL}/P' \rfloor$. The PRG size is non-increasing starting at the lowest frequency. The UE for which PMI/RI feedback is configured may receive or decode a PDSCH by assuming that the same precoder applies on all scheduled PRBs within a PRG. The PRG size that the UE may assume for given system bandwidth is given by:

TABLE 9

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

Meanwhile, in open-loop MIMO, it is very difficult to fixedly use a precoder for a specific PDSCH as a specific matrix because the eNB cannot be accurately aware of a proper precoding matrix for a DL channel in open-loop MIMO. Accordingly, in the case of open-loop MIMO having no information about precoding, it is desirable to obtain diversity in terms of antenna space by varying a precoding matrix in a different resource. Due to this problem, in CRS based open-loop MIMO, a precoding matrix is changed with respect to each RE and the same precoding matrix is applied to REs having the same number even though the REs belong to different PRBs.

Notably, in the case of a UE-RS, since a precoder applied to an RE to which a PDSCH is actually mapped in open-loop MIMO is sufficiently changed by precoder cycling, even though different precoders are applied to UE-RSs in PRBs, the precoders may not have a great influence on PDSCH transmission performance. Since UE-RSs precoded by different precoders reach the UE over different radio channels, it is difficult to simultaneously use the UE-RSs in order to estimate a specific channel. However, if UE-RSs in contiguous PRBs are transmitted after being precoded by the same precoder, the UE-RSs located in the contiguous PRBs may be used together for channel estimation, i.e. the UE-RSs may be used together for PDSCH decoding. Then, an influence of interference on the UE-RSs may be reduced. Accordingly, the present invention proposes to decode the PDSCH based on the UE-RSs under the assumption that the same precoder is applied to UE-RSs located in contiguous PRBs in performing a precoder cycling based open-loop MIMO operation. That is, in the present invention, PRB bundling may be applied to UE-RSs even in open-loop MIMO.

A PRB size, which is a unit for applying bundling, may use the above-described PRG size. Alternatively, the eNB may inform the UE of the PRB size through a higher layer signal such as an RRC signal. Alternatively, it may be assumed that the same precoder is applied to UE-RS(s) in contiguous PRBs among PRBs allocated for the PDSCH transmitted to the UE. It may also be assumed that the same precoder is applied to UE-RS(s) in all PRBs. Alternatively, since the precoder applied to the UE-RS does not necessarily need to be changed in an open-loop MIMO operation, it may be assumed that the same precoder is applied to all PRBs allocated to the UE for the PDSCH without the PRB size which is an additional reference unit for PRB bundling.

Thus, if PRB bundling is applied to UE-RSs in open-loop MIMO, the UE may estimate a channel based on UE-RSs transmitted in a plurality of PRBs and, under the assumption that a predetermined precoder is applied to antenna ports of the UE-RSs on REs to which the PDSCH is mapped (hereinafter, data REs), the UE may demodulate (or decode) signals of the data REs.

Whether to apply PRB bundling to UE-RS ports may be determined based on CSI feedback configured for the UE. For example, in precoder cycling based open-loop MIMO, although a PMI is not fed back, an RI needs to be reported for rank adaptation of the PDSCH. Hence, only the RI or CQI may be configured to be reported without the PMI and the UE configured for a UE-RS based transmission mode may decode a data signal received on the PDSCH using UE-RSs under the assumption that the UE-RSs are precoded using the same precoder in a plurality of contiguous PRBs for the PDSCH and then are transmitted.

<C. Determination of UE-RS Ports>

Next, methods for determining a UE-RS port are proposed. Open-loop MIMO, especially open-loop MIMO having a low transmission rank, has a high probability of being used for a UE located at a cell edge in which severe inter-cell interference occurs. At this time, if two contiguous cells transmit UE-RSs using the same antenna port, the UE-RSs from the two contiguous cells may collide. If the UE-RSs from the contiguous cells collide with each other, channel estimation using the UE-RSs may be degraded and PDSCH decoding performance may be deteriorated. Accordingly, antenna ports used for UE-RS transmission need to be set to be different in contiguous cells.

Method C-1) Use of Predetermined UE-RS Ports

In Method C-1 of the present invention, UE-RS ports used for open-loop MIMO are predetermined. For example, when two antenna ports among antenna ports 7, 8, 9 and 10 are used for UE-RS transmission, which one of sets such as {port 7, port 8}, {port 9, port 10}, {port 7, port 9}, and {port 8, port 10} will be used for UE-RS transmission may be predetermined through a higher layer signal such as an RRC signal. Alternatively, antenna port(s) for UE-RS transmission in open-loop MIMO may be determined based on a UE ID such as a C-RNTI, a virtual cell ID of a CSI-RS for calculating CSI, or a virtual cell ID used for scrambling sequence initialization of the PDSCH. For reference, if {port 7, port 8} is used, the PDSCH may be mapped to RS REs used by port 9 or port 10 and if {port 9, port 10} is used, the PDSCH may be mapped to RS REs used by port 7 or port 8. Therefore, RS overhead can be reduced.

Method C-2) Setting/determination of UE-RS ports through DCI

In Method C-2 of the present invention, a set of antenna ports for UE-RS transmission is determined by a specific field of DCI. A field directly indicating antenna port(s) for UE-RS transmission may be included in the DCI or the set of the antenna ports may be differently set/determined according to $n_{SCID}$ by a method similar to Method A-4 for determining the number of UE-RS ports.

In this way, if a collision problem between UE-RSs is avoided by embodiment C of the present invention, the PDSCH may not be mapped to REs which may collide with REs occupied by UE-RSs (hereinafter, UE-RS REs) of contiguous cells although UE-RSs are transmitted using only two ports and thus only 12 REs become UE-RS overhead. In other words, the PDSCH may be mapped with respect to a UE configured for open-loop MIMO under the assumption that overhead of a predetermined number of RSs, for example, 24 REs are used or reserved for UE-RS transmission regardless of the number of UE-RS ports, i.e. under the assumption that UE-RS transmission is performed over all UE-RS ports. As another method, the number of UE-RS ports or the number of REs occupied by the UE-RSs assumed in mapping the PDSCH to REs may be transmitted to the UE through a higher layer signal such as an RRC signal.

<D. CSI Feedback Method>

Methods for feeding back CSI in UE-RS based open-loop MIMO according to the present invention will now be described. As described earlier, the UE configured for open-loop MIMO may derive an RI and/or a CQI under the assumption that the eNB cyclically uses precoders according to REs and may report the RI and/or the CQI to the eNB. The RI/CQI may be calculated based on CSI-RSs.

If multi-node transmission is configured for the UE, i.e., if a transmission mode corresponding to multi-node transmission is configured for the UE, the UE may receive CSI-RS configuration information about one or more CSI-RS configuration(s). For example, joint transmission in which a plurality of CSI-RS configurations is used together to transmit a specific PDSCH may be performed. In this case, the UE may consider the plural CSI-RS configurations as one aggregated CSI-RS configuration and calculate the RI/CQI under the assumption that the PDSCH is transmitted while a precoder is cyclically applied as a predesignated pattern in the aggregated CSI-RS configuration. That is, upon receiving information about the plural CSI-RS configurations, the UE may aggregate the CSI-RS configurations and consider the CSI-RS configurations as one aggregated CSI-RS configuration. The UE may calculate the RI/CQI under the assumption that the precoder is cyclically applied to CSI-RSs corresponding to the aggregated CSI-RS configuration as a predesignated pattern. As an example, when the UE receives CSI-RS configuration 1 for 4 antenna ports and CSI-RS configuration 2 for 4 antenna ports as CSI-RS configuration information, i.e., if CSI-RS configuration 1 and CSI-RS configuration 2 are configured for the UE and each configuration includes four antenna ports, the UE may regard the two CSI-RS configurations as one CSI-RS configuration for 8 antenna ports and calculate the RI/CQI under the assumption that a precoder defined for 8 transmit antennas is applied while changing to a predetermined pattern per PRB. To this end, the eNB may inform the UE of which CSI-RS configurations should be aggregated to assume open-loop MIMO during open-loop RI/CQI calculation through a higher layer signal such as an RRC signal or through an indicator included in the DCI.

Meanwhile, in a process of calculating the RI/CQI by aggregating the plural CSI-RS configurations, the case in which the number of antenna ports of an aggregated CSI-RS configuration is not equal to the number of transmit antenna ports defined in a predesignated precoder codebook, i.e. in a PMI codebook, may occur because the numbers of transmit antenna ports of CSI-RS configurations are not equal. For example, when CSI-RS configuration 1 for four antenna ports and CSI-RS configuration 2 for two antenna ports are aggregated, the aggregated CSI-RS configuration includes 6 antenna ports. Generally, since a precoder codebook is designed by assuming $2^n$ transmit antenna ports, a precoder codebook for 6 antenna ports may be absent. In this case, only some antenna ports may be extracted from a specific CSI-RS configuration to form the aggregated CSI-RS configuration. For example, if CSI-RS configuration 1 for four antenna ports and CSI-RS configuration 2 for two antenna ports are aggregated, only two antenna ports may be extracted from CSI-RS configuration 1 and then aggregated with CSI-RS configuration 2 to form an aggregated CSI-RS configuration for four antenna ports. The RI/CQI may be calculated using CSI-RS(s) according to the aggregated CSI-RS configuration for the 4 antenna ports. Namely, if the sum of antenna ports of CSI-RS configurations is different from the numbers of antenna ports defined in the codebook, CSI-RS configurations may be aggregated in a manner of using the greatest number of antenna ports not exceeding the sum of the antenna ports of the CSI-RS configurations among the numbers of antenna ports defined in the codebook. For example, assuming that codebooks are defined for $2^n$ (n=0, 1, 2, 3, 4) transmit antenna ports and that the sum of the number(s) of antenna ports for CSI-RS configuration(s) received by the UE is y, only floor$\{\log_2(y)\}$ antenna ports may be extracted from the CSI-RS configuration(s) to form an aggregated CSI-RS configuration.

If there are many antenna ports of an individual CSI-RS configuration (e.g. if each CSI-RS configuration includes 8 antenna ports), since simple aggregation of CSI-RS configurations corresponds to too many antenna ports, operation for extracting some antenna ports from antenna ports of CSI-RS configurations is advantageous in that the number of antenna ports of the aggregated CSI-RS configuration can be reduced. Extracting only some antenna ports from antenna ports of CSI-RS configurations may mean that only CSI-RSs for some antenna port(s) among antenna ports of a specific CSI-RS configuration are selected. Alternatively, if any CSI-RS configuration includes N1 transmit antennas and if only N2 antennas of the N1 transmit antennas (where N2<N1) should be used to form an aggregated CSI-RS configuration, extracting only some antenna ports may mean that an N2×N1 precoding matrix is applied to CSI-RSs for the N1 transmit antennas. The N2×N1 precoding matrix may be predesignated or may vary with a predetermined scheme per PRB. Consequently, extracting only some antenna ports from antenna ports of a CSI-RS configuration may mean that the UE calculates the RI/CQI under the assumption that (N2−N1) antenna ports among N2 antenna ports corresponding to the CSI-RS configuration, i.e. among N2 antenna ports configured for CSI-RS transmission do not participate in CSI-RS transmission. In other words, the UE may derive and feed back the RI/CQI under the assumption that CSI-RSs are transmitted only on N2 antenna ports among N1 antenna ports configured for CSI-RS transmission.

Embodiment A, embodiment B, embodiment C, and/or embodiment D may be applied by combination. For example, the number of UE-RS ports may be set/determined based on of the methods described in embodiment A; a PDSCH may be decoded using UE-RSs according to embodiment B under the assumption that the UE-RSs are transmitted over the set/determined number of UE-RS ports; UE-RS ports actually used for UE-RS transmission may be set/determined by embodiment C; and CSI may be reported to the UE using at least of one or more CSI-RSs configured for the UE by using one of the methods described in embodiment D.

The embodiments of the present invention will be described again with reference to FIG. 10. The eNB processor may set the number of UE-RS ports according to any one of Methods A-1 to A-4 of the present invention. For example, the eNB processor may set the number of UE-RS ports based on the number of CSI-RS ports for at least one of CSI-RS configuration(s) configured for the UE. The eNB processor may control the eNB RF unit to transmit UE-RSs on UE-RS REs corresponding to each of UE-RS ports.

The UE RF unit receives DL data and UE-RS(s) for the PDSCH within a PRB to which the PDSCH is mapped under the control of the UE processor. The PRB(s) to which the PDSCH is mapped may be indicated to the UE through DCI associated with the PDSCH. The UE processor may assume that the number of UE-RS ports is set according to any one of Methods A-1 to A-4 of the present invention. For example, if the eNB and the UE are implemented according to Method A-2 of the present invention, the UE processor may be configured to set/determine the number of UE-RS ports based on the number of CSI-RS ports corresponding to at least one of one or more CSI-RS configurations for the UE. The eNB processor may be configured to cyclically apply predetermined precoders to PDSCH REs according to subcarriers or REs in accordance with embodiment B of the present invention. For example, the eNB processor may precode signals carried on PDSCH REs by a precoder determined according to subcarriers or REs and then may perform RE mapping. The eNB processor may precode UE-RS(s) mapped to one PRB by the same precoder and than may perform RE mapping. Further, when PRB bundling is configured for the UE in open-loop MIMO, the eNB processor may precode, using one precoder, UE-RS(s) mapped to contiguous PRBs among a plurality of PRBs to which the PDSCH of the UE is allocated. Upon determining through which antenna port the UE-RS(s) is to be transmitted, the eNB processor may fixedly configure predetermined antenna port(s) as UE-RS port(s) for the UE or may semi-statically configure sets of available antenna ports for the UE by controlling the eNB RF unit to transmit a higher layer signal including information about sets of several antenna ports. In the second case, the eNB processor may inform the UE of the UE-RS port(s) by controlling the eNB RF unit to transmit DCI including information indicating a set of antenna ports actually used for UE-RS transmission. The eNB processor may control the eNB RF unit to transmit UE-RS(s) on a PRB to which the PDSCH associated with the UE-RS(s) is mapped through antenna port(s) configured as UE-RS port(s).

The UE processor may be configured to measure a UE-RS channel between UE-RS port(s) and the UE by using UE-RSs according to embodiment B of the present invention and may be configured to decode DL data received through the PDSCH based on the measured channel. That is, the UE processor may decode the PDSCH based on the UE-RSs according to embodiment B of the present invention. The UE processor according to embodiment B of the present invention may decode a DL data signal received on the PDSCH under the assumption that different precoders are applied according to a subcarrier or an RE (according to a specific rule) to a PDSCH RE among REs in a PRB to which the PDSCH is mapped and that the same precoder is applied to the UE-RS(s) in the PRB. In addition, if PRB bundling is configured for the UE in open-loop MIMO, the UE processor may decode the PDSCH under the assumption that UE-RS(s) mapped to contiguous PRBs among a plurality of PRBs to which the PDSCH for the UE is allocated are precoded by one precoder and then transmitted to the UE. The UE processor may decode the PDSCH under the assumption that the UE-RS(s) is transmitted through predetermined antenna port(s) or through a set of antenna ports indicated by the DCI among sets of semi-statically configured several antenna ports.

The UE processor of the UE configured for open-loop MIMO may calculate an RI and/or a CQI under the assumption that the eNB cyclically applies a precoder per RE and may control the UE RF unit to transmit the calculated RI and/or CQI to the eNB.

Since the eNB processor knows that the UE is configured for open-loop MIMO, the eNB processor may recognize that the UE calculates the RI and/or the CQI on the assumption that a different precoder per RE is applied and the UE may estimate a DL channel state based on the RI and/CQI.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for receiving downlink data by a user equipment, the method comprising:
receiving information about one or more channel state information reference signal (CSI-RS) configurations;
receiving the downlink data on a physical downlink shared channel (PDSCH); and
decoding the downlink data using a user equipment specific reference signal (UE-RS) received on a physical resource block (PRB) to which the PDSCH is mapped, wherein a number of antenna ports for the UE-RS (hereinafter, the number of UE-RS ports) is assumed based on a number of antenna ports of at least one of the one or more CSI-RS configurations (hereinafter, the number of CSI-RS ports).

2. The method according to claim 1, wherein the number of UE-RS ports is assumed based on a number of CSI-RS ports of a CSI-RS configuration indicated as a CSI-RS configuration associated with the UE-RS among the one or more CSI-RS configurations, a number of CSI-RS ports of a CSI-RS configuration having a minimum index among the one or more CSI-RS configurations, a number of CSI-RS ports of a CSI-RS configuration having a maximum index among the one or more CSI-RS configurations, a minimum number of CSI-RS ports among numbers of CSI-RS ports of the one or more CSI-RS configurations, a maximum number of CSI-RS ports among the numbers of CSI-RS ports of the one or more CSI-RS configurations, or a sum of numbers of CSI-RS ports of the one or more CSI-RS configurations.

3. The method according to claim 1, wherein the number of UE-RS ports is assumed to be equal to the number of CSI-RS ports.

4. The method according to claim 1, wherein the number of UE-RS ports is assumed to be equal to the number of CSI-RS ports within a range not exceeding a predetermined number.

5. The method according to claim 1, wherein the UE-RS is assumed to be precoded by the same precoder in the PRB.

6. The method according to claim 1, wherein the downlink data is assumed to be precoded by a different precoder according to a resource element to which the downlink data is mapped.

7. A user equipment for receiving downlink data, the user equipment comprising:
a radio frequency (RF) unit and a processor configured to control the RF unit,
wherein the processor is configured to control the RF unit to receive information about one or more channel state information reference signal (CSI-RS) configurations; is configured to control the RF unit to receive the downlink data on a physical downlink shared channel (PDSCH); and is configured to decode the downlink data using a user equipment specific reference signal (UE-RS) received on a physical resource block (PRB) to which the PDSCH is mapped, and
wherein the processor is configured to decode the downlink data by assuming a number of antenna ports for the UE-RS (hereinafter, the number of UE-RS ports) based on a number of antenna ports of at least one of the one or more CSI-RS configurations (hereinafter, the number of CSI-RS ports).

8. The user equipment according to claim 7, wherein the number of UE-RS ports is set based on a number of CSI-RS ports of a CSI-RS configuration indicated as a CSI-RS configuration associated with the UE-RS among the one or more CSI-RS configurations, a number of CSI-RS ports of a CSI-RS configuration having a minimum index among the one or more CSI-RS configurations, a number of CSI-RS ports of a CSI-RS configuration having a maximum index among the one or more CSI-RS configurations, a minimum number of CSI-RS ports among the numbers of CSI-RS ports of the one or more CSI-RS configurations, a maximum number of CSI-RS ports among numbers of CSI-RS ports of the one or more CSI-RS configurations, or a sum of numbers of CSI-RS ports of the one or more CSI-RS configurations.

9. The user equipment according to claim 7, wherein the number of UE-RS ports is assumed to be equal to the number of CSI-RS ports.

10. The user equipment according to claim 7, wherein the number of UE-RS ports is assumed to be equal to the number of CSI-RS ports within a range not exceeding a predetermined number.

11. The user equipment according to claim 7, wherein the UE-RS is assumed to be precoded by the same precoder in the PRB.

12. The user equipment according to claim 7, wherein the downlink data is assumed to be precoded by a different precoder according to a resource element to which the downlink data is mapped.

13. A method for transmitting downlink data by a base station, the method comprising:
transmitting information about one or more channel state information reference signal (CSI-RS) configurations;
transmitting the downlink data on a physical downlink shared channel (PDSCH); and
transmitting a user equipment specific reference signal (UE-RS) received on a physical resource block (PRB) to which the PDSCH is mapped,
wherein a number of antenna ports for the UE-RS (hereinafter, the number of UE-RS ports) is configured based on a number of antenna ports of at least one of the one or more CSI-RS configurations (hereinafter, the number of CSI-RS ports).

14. A base station for transmitting downlink data, the base station comprising:
a radio frequency (RF) unit and a processor configured to control the RF unit,
wherein the processor controls the RF unit to transmit information about one or more channel state information reference signal (CSI-RS) configurations; controls the RF unit to transmit the downlink data on a physical downlink shared channel (PDSCH); and controls the RF unit to transmit a user equipment specific reference signal (UE-RS) received on a physical resource block (PRB) to which the PDSCH is mapped, and
wherein the processor is configured to configure a number of antenna ports for the UE-RS (hereinafter, the number of UE-RS ports) based on a number of antenna ports of at least one of the one or more CSI-RS configurations (hereinafter, the number of CSI-RS ports).

* * * * *